(12) United States Patent
Larri et al.

(10) Patent No.: US 9,076,441 B2
(45) Date of Patent: Jul. 7, 2015

(54) SPEECH RECOGNITION CIRCUIT AND METHOD

(71) Applicant: Zentian Limited, Cambridge (GB)

(72) Inventors: Guy Larri, Cambridge (GB); Mark Catchpole, Cambridge (GB); Damian Kelly Harris-Dowsett, Coventry (GB); Timothy Brian Reynolds, Cambridge (GB)

(73) Assignee: Zentian Limited, Cambridge (GB)

( * ) Notice: Subject to any disclaimer, the term of this patent is extended or adjusted under 35 U.S.C. 154(b) by 251 days.

(21) Appl. No.: 13/735,091

(22) Filed: Jan. 7, 2013

(65) Prior Publication Data

US 2013/0211835 A1    Aug. 15, 2013

Related U.S. Application Data

(60) Continuation of application No. 13/162,128, filed on Jun. 16, 2011, now Pat. No. 8,352,262, which is a division of application No. 11/662,704, filed as application No. PCT/GB2005/003554 on Sep. 14, 2005, now Pat. No. 7,979,277.

(30) Foreign Application Priority Data

Sep. 14, 2004   (GB) .................................. 0420464.0

(51) Int. Cl.
  *G10L 15/06* (2013.01)
  *G10L 15/10* (2006.01)
  *G10L 15/28* (2013.01)

(52) U.S. Cl.
  CPC .................. *G10L 15/06* (2013.01); *G10L 15/10* (2013.01); *G10L 15/285* (2013.01)

(58) Field of Classification Search
  CPC ...................................................... G10L 15/06

USPC .......................................................... 704/238
See application file for complete search history.

(56) References Cited

U.S. PATENT DOCUMENTS 5,881,312 A    3/1999   Dulong
6,374,220 B1   4/2002   Kao
(Continued)

FOREIGN PATENT DOCUMENTS

EP   1 178 466 A2   2/2002
GB   2 333 172 A    7/1999
(Continued)

OTHER PUBLICATIONS

Glinski et al., "Spoken Language Recognition on DSP Array Processor" IEEE Transactions on Parallel and Distributed Systems, vol. 5, No. 7, pp. 697-703, Jul. 1, 1994.
(Continued)

*Primary Examiner* — Susan McFadden
(74) *Attorney, Agent, or Firm* — Dickstein Shapiro LLP

(57) ABSTRACT

A speech recognition circuit comprising a circuit for providing state identifiers which identify states corresponding to nodes or groups of adjacent nodes in a lexical tree, and for providing scores corresponding to said state identifiers, the lexical tree comprising a model of words; a memory structure for receiving and storing state identifiers identified by a node identifier identifying a node or group of adjacent nodes, said memory structure being adapted to allow lookup to identify particular state identifiers, reading of the scores corresponding to the state identifiers, and writing back of the scores to the memory structure after modification of the scores; an accumulator for receiving score updates corresponding to particular state identifiers from a score update generating circuit which generates the score updates using audio input, for receiving scores from the memory structure, and for modifying said scores by adding said score updates to said scores; and a selector circuit for selecting at least one node or group of adjacent nodes of the lexical tree according to said scores.

37 Claims, 27 Drawing Sheets

Functions performed by the accelerator are shown in grey
 Functions performed by other hardware or software systems are shown in white

(56) References Cited

U.S. PATENT DOCUMENTS

| | | | |
|---|---|---|---|
| 7,328,153 B2 | 2/2008 | Wells et al. | |
| 7,979,277 B2 * | 7/2011 | Larri et al. | 704/238 |
| 8,036,890 B2 * | 10/2011 | Catchpole | 704/235 |
| 8,352,262 B2 * | 1/2013 | Larri et al. | 704/238 |
| 8,612,227 B2 * | 12/2013 | Kato | 704/256.5 |
| 2003/0061046 A1 | 3/2003 | Zhao et al. | |
| 2004/0111264 A1 | 6/2004 | Wang et al. | |

FOREIGN PATENT DOCUMENTS

| | | |
|---|---|---|
| GB | 2 391 679 A | 2/2004 |
| WO | WO 01/48737 A2 | 7/2001 |
| WO | WO 01/75862 A2 | 10/2001 |
| WO | WO 03/067572 A2 | 8/2003 |

OTHER PUBLICATIONS

S. Chatterjee et al., "Connected Speech Recognition on a Multiple Processor Pipeline." ICASSP 89, pp. 774-777, May 23, 1989.

* cited by examiner

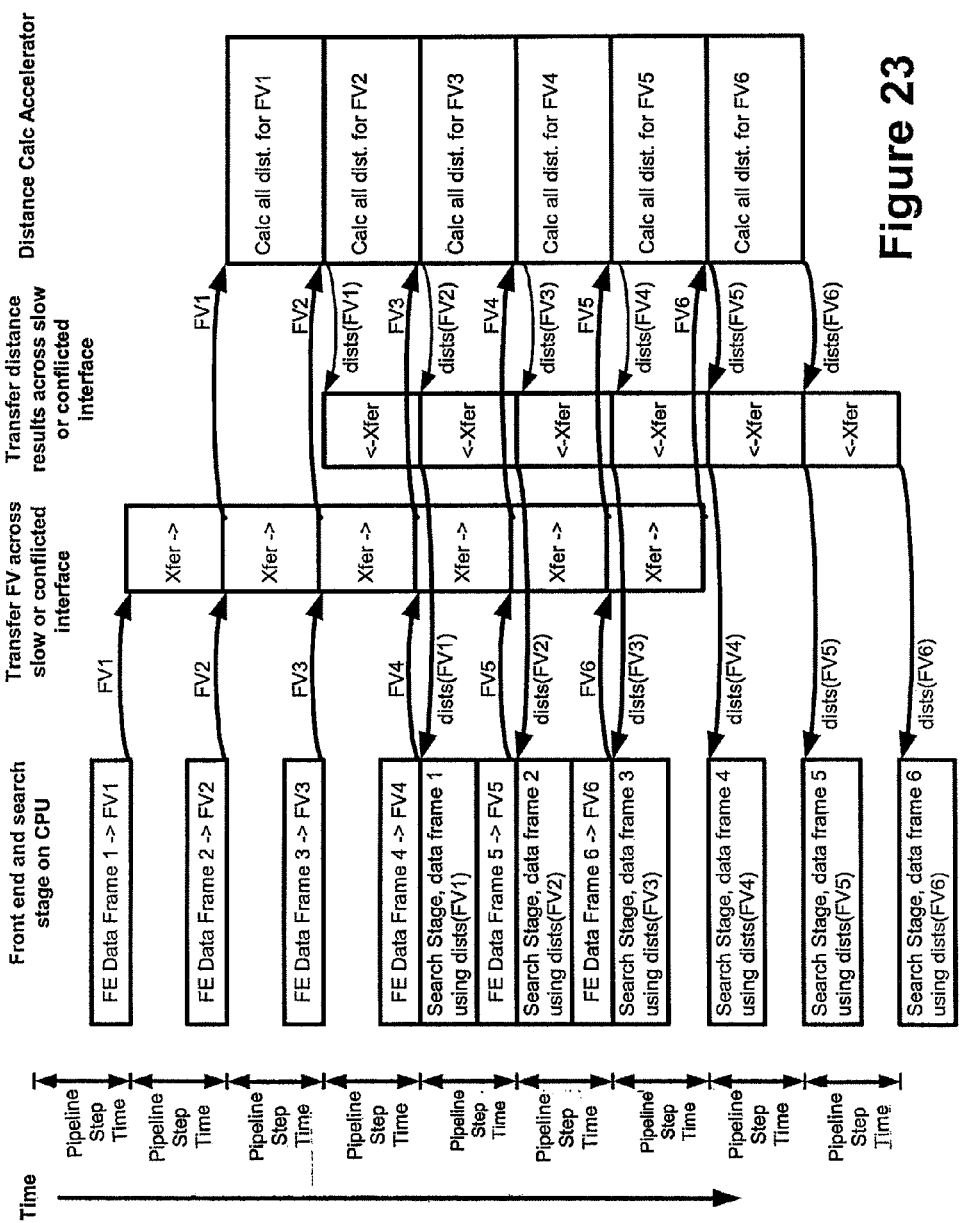

SPEECH RECOGNITION CIRCUIT AND METHOD

This is a continuation of application Ser. No. 13/162,128, filed Jun. 16, 2011, now U.S. Pat. No. 8,352,262, which is a divisional of application Ser. No. 11/662,704, filed Mar. 14, 2007, now U.S. Pat. No. 7,979,277, which is a 371 of PCT/GB2005/003554, filed Sep. 14, 2005, which claims priority to UK Application No. 0420464.0, filed Sep. 14, 2004, the disclosures of which are hereby incorporated by reference in their entireties.

The present invention relates to speech recognition circuits and methods. These circuits and methods have wide applicability, particularly for devices such as mobile electronic devices.

There is growing consumer demand for embedded speech recognition in mobile electronic devices, such as mobile phones, dictation machines, PDAs (personal digital assistants), mobile games consoles, etc. For example, email and text message dictation, note taking, form filling, and command and control applications are all potential applications of embedded speech recognition.

However, when a medium to large vocabulary is required, effective speech recognition for mobile electronic devices has many difficulties not associated with speech recognition systems in hardware systems such as personal computers or workstations. Firstly, the available power in mobile systems is often supplied by battery, and may be severely limited. Secondly, mobile electronic devices are frequently designed to be as small as practically possible. Thus, the memory and resources of such mobile embedded systems tends to be very limited, due to power and space restrictions. The cost of providing extra memory and resources in a mobile electronic device is typically much higher than that for a less portable device without this space restriction. Thirdly, the mobile hardware may be typically used in a noisier environment than that of a fixed computer, e.g. on public transport, near a busy road, etc. Thus, a more complex speech model and more intensive computation may be required to obtain adequate speech recognition results.

These restrictions have made it difficult to implement effective speech recognition in mobile devices, other than with very limited vocabularies.

Some prior art schemes have been proposed to increase the efficiency of speech recognition systems, in an attempt to make them more suitable for use in mobile technology.

In an article entitled "A low-power accelerator for the SPHINX 3 speech recognition system", in University of Utah, International conference on Compilers, Architectures and Synthesis for Embedded Systems, November 2003, Davis et al have proposed the idea of using a special purpose co-processor for up-front calculation of the computationally expensive Gaussian output probabilities of audio frames corresponding to particular states in the acoustic model.

In an article entitled "Hardware Speech Recognition in Low Cost, Low Power Devices", University of California, Berkeley, CS252 Class Project, Spring 2003, Sukun Kim et al describe using special purpose processing elements for each of the nodes in the network to be searched. This effectively implies having a single processing element for each phone in the network. An alternative suggested by Sukun Kim et al is to provide a processor for each state in the network.

In an article entitled "Dynamic Programming Search for Continuous Speech Recognition" in IEEE Signal Processing Magazine, September 1999, Ney et al discuss language model lookahead. Language model lookahead involves computation of a language model factor for each node (i.e. phone) in the lexical tree. This technique is also known as smearing. Each phone instance in the search network can be given a language model factor when it is used in the lexical tree search. Ney et al show that for an example bigram language model, the average number of states per 10 ms frame can be reduced from around 168,000 states with no language model lookahead to around 8,000 states when language model lookahead is used. They also show that bigram language model lookahead requires about a quarter of the states compared with unigram language model lookahead.

Although these prior art documents provide improvements to speech recognition in embedded mobile technology, further improvement is still needed to provide a larger vocabulary and better accuracy.

One aspect of the present invention provides a speech recognition circuit including a circuit for providing state identifiers which identify states corresponding to nodes or groups of adjacent nodes in a lexical tree, and for providing scores corresponding to said state identifiers. The lexical tree includes a model of words. The speech recognition circuit also has a memory structure for receiving and storing state identifiers identified by a node identifier identifying nodes or groups of adjacent nodes, the memory structure being adapted to allow lookup to identify particular state identifiers, reading of the scores corresponding to the state identifiers, and writing back of the scores to the memory structure after modification of the scores. An accumulator is provided for receiving score updates corresponding to particular state identifiers from a score update generating circuit which generates the score updates using audio input, for receiving scores from the memory structure, and for modifying said scores by adding said score updates to said scores. A selector circuit is used for selecting at least one node or group of nodes of the lexical tree according to said scores.

One suitable type of hardware for the memory structure includes a content addressable memory (CAM). A CAM is a memory unit which stores a series of data items using a series of addresses. However, the memory is accessed by specifying a data item, such that the CAM returns the corresponding address. This contrasts with a random access memory (RAM) in which the memory is accessed by specifying an address, such that the RAM returns the corresponding data item.

However, the memory structure is not limited to including a CAM. Other types of hardware are also possible, to provide this functionality. For example, a single chip which operates in the same way as a CAM and RAM may be used instead.

Embodiments of the present invention provide a solution to the problem of how to map a lexical tree search to a CAM system architecture. The realisation by the present inventors that certain speech recognition data structures can be mapped into the CAMs allows a lexical tree search to be performed using a CAM system architecture.

Further embodiments of the invention include a counter for sequentially generating state identifiers, and using said generated state identifiers to sequentially lookup said states in the memory structure.

The node identifier may comprise a direct reference to the lexical tree. However, in some embodiments, the node identifier for at least some of the states includes a pointer to a node identifier for another state. For example, a state corresponding to the furthest part of the search path in the lexical tree may be referenced by a node identifier which directly links to a particular node or group of nodes in the lexical tree. In a lexical tree comprising phones, using a state model of triphones, the node identifier may indicate the position of a triphone in the lexical tree.

However, in this example, for states occurring further back in the search path, instead of supplying a node identifier linking directly to the lexical tree, instead a pointer to a node identifier of another state may be supplied. E.g. a triphone instance may have a pointer to another triphone instance, which has a pointer to another triphone instance, which has a pointer to a node or group of nodes in the lexical tree. Chains of reference may be set up in this way, where only the last state in the chain has a direct pointer to the lexical tree.

There may not be a one-to-one correspondence between the nodes of the lexical tree and the node identifiers. This will occur for a branched lexical tree, where the nodes represent monophones, but the acoustic model states represent triphones, i.e. groups of three adjacent monophones. Then, paths of three monophones will have unique identifiers to be stored in the memory structure, rather than single monophones having unique identifiers.

Phone instance numbers may be generated, and used to uniquely label each phone instance. They can be generated sequentially, using a counter. The phone instance numbers may be used as pointers between phone instances to assist in node identification. It is thus not essential to provide a direct node identifier for each phone instance to directly indicate a location in the lexical tree. The dynamic network of phone instances provided in the memory structure may thus include both direct and relative references to the lexical tree.

The memory structure may be divided into one part which stores phone instance identifiers and direct references to the lexical tree, and a second part which stores phone instance identifiers and corresponding states. This can speed up the processing, by only storing the phone instances which are furthest on in the lexical tree in the first part of the memory structure.

The memory structure may also be divided into separately accessable units, to reduce the amount to data in each unit, thereby decreasing the chance of finding the same two states identifiers in different phone instances in any single memory unit; and increasing the chance of some state identifiers being completely absent from any single memory unit. This makes it easier to deal with the situation when the same two state identifiers are found, because a spare time slot is available for processing when a state identifier is not present.

A further aspect of the invention provides a distance calculation engine within a speech recognition system. The distance calculation engine may be included within an accelerator. The accelerator may include logic to interface with other parts of a speech recognition circuit, in addition to the distance engine, although this is not essential. For example, the accelerator may include one or more results memories for storing distances calculated by the distance calculation engine. The accelerator may also include at least one of a memory for storing one or more acoustic models, a decompressor for decompressing acoustic data that has been stored in a compressed format, a memory for storing feature vectors, a checksum or data signature calculation means, buffers for data storage, and data registers. The accelerator may be implemented in software or in hardware, or in a combination. It may be physically separate to the rest of the speech recognition circuit, although this is not essential.

The distance calculation engine may calculate one or more of a wide range of distance metrics and probability distributions. The distances may represent the likely correspondance of feature vectors to states in an acoustic model. In other words, the distances can indicate the similarity of an audio data frame to each possible state in an acoustic model There are a wide variety of probability distributions that can be used for the distance calculation stage of a speech recogniser, and a wide variety of distance metrics used. These are widely documented in the literature. A point is a simple example of a probability distribution.

A common choice is to use Gaussian Distributions and correspondingly the Mahalanobis Distance metric. The Gaussian probability distribution is then defined by a mean vector, which defines centre point in the N-dimensional space, and a Covariance matrix which defines the shape of the probability distribution. It is common to restrict the Covariance matrix to be a diagonal matrix (only N non-zero values along the diagonal of the N×N matrix) which significantly lowers the implementation cost by reducing the number of arithmetic operations.

In particular embodiments, the distance calculated is a Mahalanobis distance. Particular examples of this are described later in the specification.

In one embodiment, the distance engine autonomously computes all of the distances associated with a given feature vector. This may comprise computing distances for every state in the lexicon. The distance engine may operate in a pipelined manner with other stages of the recognition process. In this context a distance is an indication of the probability or likelihood that a feature vector corresponds to a particular state. An important class of distance computation in speech recognition is the calculation of output state probabilities in recognisers using Hidden Markov Models. Another possible use is in recognisers using Neural Networks.

The distance engine reads data from the acoustic models to use as parameters in the calculation. The acoustic models may be optionally stored in a compressed format. The distance engine may read and de-compress the acoustic models one (or more) times for each feature vector processed. Each reading of the acoustic models may require reading the entire acoustic model, or various optimisations may be implemented to avoid reading parts of the acoustic model that are not required to be used for calculations with the current feature vector. The distance engine may use a de-compression method where the de-compression is sign or zero extension or may otherwise convert data of narrow or variable width to a wider data format. The distance engine may use a de-compression method where the de-compression is sign or zero extension or may otherwise convert data of narrow or variable width to IEEE standard single or double precision floating point format. The distance engine may use a decompression method where decompression is a codebook decompression of a binary bitstream, where the codebook is stored as part of the acoustic model data. The distance engine may use a decompression method where the decompression is decompression of a Huffman or Lempel-Ziv compressed stream. The distance engine may use a decompression method where decompression is decompression of run length encoded data. The distance engine may use a decompression method where decompression is decompression of difference encoded data. The distance engine may use a decompression method using any well known lossy or lossless compression scheme. The distance engine may use a decompression method using subspace distribution clustering. The distance engine may use a decompression method comprising any combination of the above described decompression types.

The distance engine may read the acoustic models from a dedicated on-chip memory. The distance engine may read the acoustic models from a dedicated off-chip memory. The distance engine may read the acoustic models from a shared on-chip memory. The distance engine may read the acoustic models from a shared off-chip memory. Any of these acoustic models may be compressed.

The distance engine may compute a CRC or checksum or similar signature as it reads in the acoustic model and compares this to a stored CRC, checksum, or signature, in order to check that the acoustic model has not been corrupted, and signals an error condition if such corruption is detected. The stored CRC, Checksum, or signature may had been pre-computed and stored in the model data, or it may be computed at the time the model data is loaded into the Acoustic Model Memory. It may be held in Acoustic Model Memory, or it may be loaded into a register or another memory from where it can be accessed and compared when the CRC/checksum/signature is computed each time the Acoustic Model is loaded.

The distance engine may support the pass-through of data from the front-end to the search-stage. The data to be passed through will be supplied to the distance engine as an adjunct to the feature vector, and the distance engine will pass it to the search stage as an adjunct to the distance results. This provides a simple mechanism for passing frame-specific data that is not involved in the distance calculation through to the search stage, and keeping it associated with the correct frame, which may otherwise be complex in pipelined systems with multiple processors. The data passed through may be for any purpose. Examples might include silence detected, end-of-audio-stream detected, a frame number, information that some intervening frames have been dropped, or data from another input device such as a button or keyboard in a multi-modal interface.

The distance engine may be implemented in hardware, software, or a combination. Other stages may be implemented in hardware, software, or a combination. The distance engine may be implemented with any number representation format including fixed point or floating point arithmetic, or any mixture of number representation formats.

In particular, the other stages may be implemented on a CPU, or on a DSP and CPU. The "DSP" and "CPU" may each be implemented as software programmable devices.

The distance engine may implement one or more additional pipeline stages to overcome delays introduced by low bandwidth, high latency, or conflicted bus interfaces. The distance engine may also implement additional pipeline stages to maintain the same throughput while allowing more time for each distance calculation. Particular embodiments of the invention may include one or more of the above aspects.

A further aspect of the invention comprises a speech recognition circuit, comprising: an audio front end for calculating a feature vector from an audio signal, wherein the feature vector comprises a plurality of extracted and/or derived quantities from said audio signal during a defined audio time frame; calculating circuit for calculating a distance indicating the similarity between a feature vector and a predetermined acoustic state of an acoustic model; and a search stage for using said calculated distances to identify words within a lexical tree, the lexical tree comprising a model of words; a buffer memory between the calculating circuit and the search stage, for receiving data passing from the calculating circuit to the search stage, wherein a processor in the search stage has higher bandwidth and/or lower latency access to the buffer compared to the bandwidth and/or latency of direct transfer between the calculating circuit and the search stage. The data transfer from the calculating circuit to the buffer memory and/or from the buffer memory to the search stage may be performed as one or more sequential bursts. The data transfer to the buffer memory may be performed in parallel with data transfer to the calculating circuit and/or in parallel with data transfer to the search stage. A second buffer memory may be provided between the audio front end and the calculating circuit.

A further aspect of the invention comprises a speech recognition circuit, comprising: an audio front end for calculating a feature vector from an audio signal, wherein the feature vector comprises a plurality of extracted and/or derived quantities from said audio signal during a defined audio time frame; calculating circuit for calculating a distance indicating the similarity between a feature vector and a predetermined acoustic state of an acoustic model; and a search stage for using said calculated distances to identify words within a lexical tree, the lexical tree comprising a model of words; comprising an elastic buffer between at least one of the front end and calculating circuit, or the calculating circuit and search stage, and/or for buffering said audio signal.

A further aspect of the invention comprises an accelerator for a speech recognition circuit, the accelerator comprising: calculating means for calculating a distance indicating the similarity between a feature vector and a predetermined acoustic state of an acoustic model, wherein the feature vector comprises a plurality of extracted and/or derived quantities from an audio signal during a defined audio time frame; means for comparing a first version of a stored checksum of data representing said acoustic model and a second version of said stored checksum, wherein the second version is obtained from an updated measurement and calculation of the checksum; and means for indicating an error status if the checksums do not match.

A further aspect of the invention comprises an accelerator for a speech recognition circuit, the accelerator comprising: calculating means for calculating a distance indicating the similarity between a feature vector and a predetermined acoustic state of an acoustic model, wherein the feature vector comprises a plurality of extracted and/or derived quantities from an audio signal during a defined audio time frame; wherein said accelerator is configured to autonomously compute distances for every acoustic state defined by the acoustic model.

A further aspect of the invention comprises an accelerator for calculating distances for a speech recognition circuit, the accelerator comprising: calculating circuit for calculating distances indicating the similarity between a feature vector and a plurality of predetermined acoustic states of an acoustic model, wherein the feature vector comprises a plurality of extracted and/or derived quantities from an audio signal during a defined audio time frame; first and second storage circuit, which may be referred to as result memories, each for storing calculated distances for at least one said audio time frame, and for making said stored distances available for use by another part of the speech recognition circuit; control circuit for controlling read and write access to the first and second storage circuit, said control means being configured to allow writing to one said storage means while the other said storage means is available for reading, to allow first calculated distances for one audio time frame to be written to one said storage means while second calculated distances for an earlier audio time frame are made available for reading from the other said storage means.

Embodiments of the invention may comprise means for generating a checksum or computed signature for the acoustic model data stored in the memory, and means for comparing checksums or computed signatures that have been calculated at different times, to indicate an error status if the checksums do not match, one possible cause of such mismatch being that the acoustic model data has been overwritten by said other data and said error status being used to indicate that the acoustic model should be re-loaded into the said memory.

A further aspect of the invention comprises a speech recognition circuit comprising: lexical memory containing lexical data for word recognition, said lexical data comprising a lexical tree data structure comprising a model of words; means for accessing a state model corresponding to each phone or each group of phones in the lexical tree; a content addressable memory for storing content addressable data for each phone or group of phones, including states corresponding to said phone or group of phones, and for storing an address value for each said phone or group of phones; a RAM configured to store accumulated scores for each said phone or group of phones, the accumulated scores being addressable by said address value for each said phone or group of phones; means to obtain scores that each of a plurality of frames of an audio signals corresponds to each of a plurality of said states; a counter to sequentially search for each said state in the content addressable memory, to obtain the corresponding address value if the state is found in the content addressable memory; means to use said address value to access an accumulated likelihood and an accumulator to add said likelihood to the accumulated likelihood; means to use the phones or groups of phones with the highest accumulated scores to obtain a plurality of next phones from the lexical tree which correspond to the next phone; and output means for outputting a lexical tree path of highest likelihood.

A further aspect of the invention comprises speech recognition apparatus comprising: a lexical tree having a corresponding state model; means for obtaining scores of an audio input corresponding to each of a plurality of states in said state model; a content addressable memory for storing a marker indicating a part of the lexical tree, and one or more states associated with said part of the lexical tree; a random access memory addressable by the CAM output, to output accumulated scores for states corresponding to said parts of the lexical tree; adder means for adding likelihood to said accumulated likelihood, to be stored back in the RAM.

A further aspect of the invention comprises speech recognition apparatus, comprising: a CAM-RAM arrangement for storing records including pointers to a lexical tree, and accumulative scores for states within the lexical tree; input means for obtaining scores that an audio frame corresponds to a particular state in the lexical tree; an accumulator for calculating the updated scores and modifying the records in the CAM-RAM accordingly; output means for outputting a path of highest likelihood in the lexical tree.

A further aspect of the invention comprises a speech recognition method comprising: storing state identifiers which identify states corresponding to nodes or groups of adjacent nodes in a lexical tree, and scores corresponding to said state identifiers in a memory structure, the lexical tree comprising a model of words and the memory structure being adapted to allow lookup to identify particular state identifiers, reading of the scores corresponding to the state identifiers, and writing back of the scores to the memory structure after modification of the scores; repeating the following sequence of steps for each of a plurality of incoming frames of an audio signal; obtaining score updates corresponding to the likelihoods that said frame of the audio signal corresponds to each of a plurality of said states; accessing said memory structure to obtain scores, updating the scores by adding score updates to the scores, and writing back the updated scores to the memory structure; determining if scores for states furthest on in the lexical tree correspond to a significant likelihood, and if so, then accessing the lexical tree to determine the next set of possible states; and storing the next set of possible states and said scores of significant likelihood in the memory structure.

A further aspect of the invention comprises speech recognition circuit comprising: a circuit for providing state identifiers which identify states corresponding to phones or groups of adjacent phones in a lexical tree, and for providing scores corresponding to said state identifiers, the lexical tree comprising a model of words; a memory structure for receiving and storing state identifiers and phone instance identifiers uniquely identifying instances of phones or groups of phones in the lexical tree; said memory structure being adapted to allow lookup to identify particular state identifiers, reading of the scores corresponding to the state identifiers, and writing back of the scores to the memory structure after modification of the scores; an accumulator for receiving score updates corresponding to particular state identifiers from a score update generating circuit which generates the score updates using audio input, for receiving scores from the memory structure, and for modifying said scores by adding said score updates to said scores; and a selector circuit for selecting at least one phone instance identifier according to said scores.

A speech recognition apparatus according to the invention may be embedded in or included in a mobile electronic device such as a mobile telephone, PDA (personal digital assistant), etc.

Embodiments of the present invention will now be described, by way of example only, with reference to the accompanying drawings, in which:

FIG. 23 shows an example of actual data flow in a speech accelerator pipeline with two data transfer stages according to an embodiment of the invention.

Figure 1A:
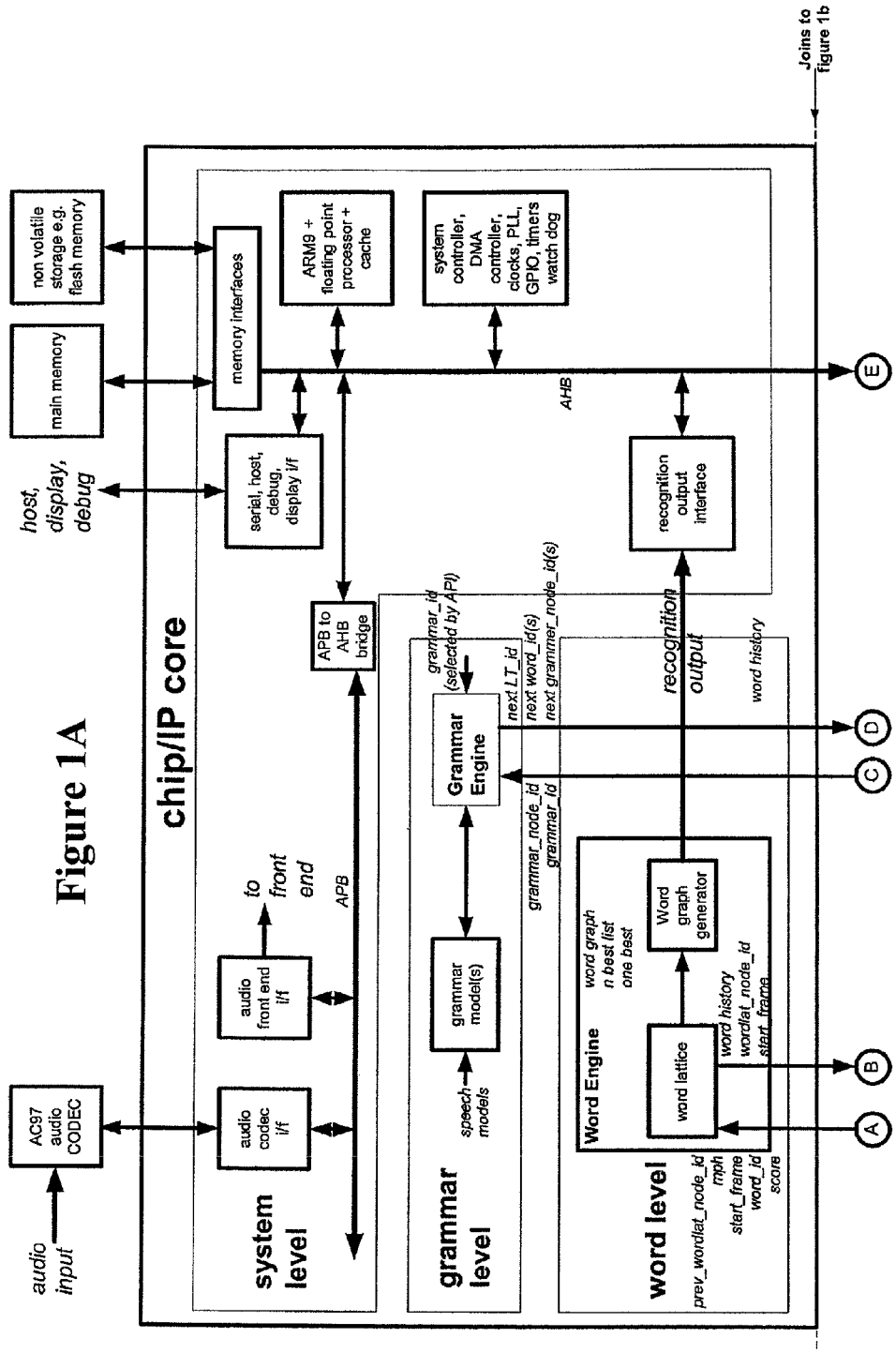
FIGS. 1A-1B are a block diagram of the system architecture for a speech recognition apparatus according to an embodiment of the invention.
Figure 1B:
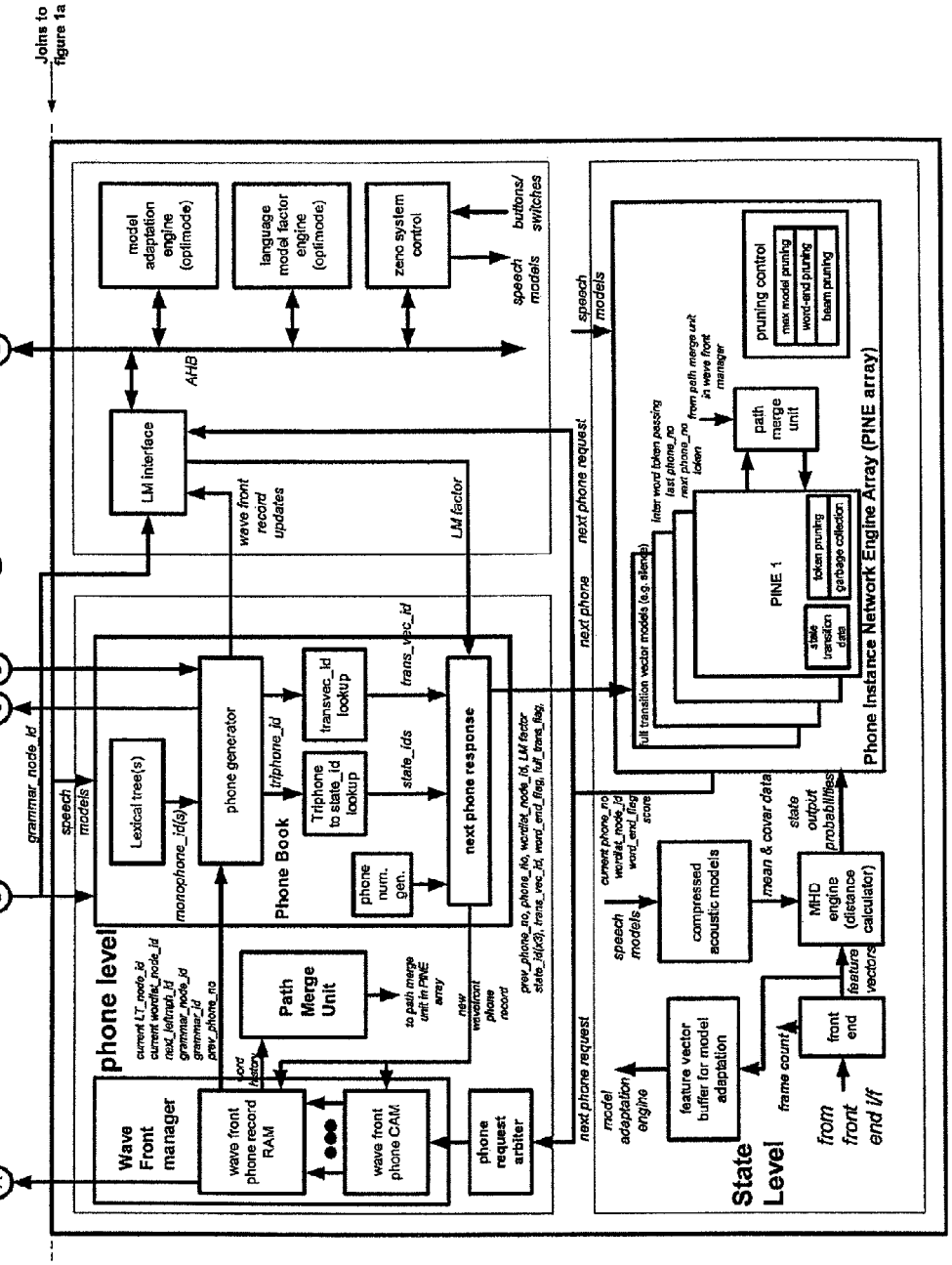

FIGS. 1A-1B show a speech recognition system architecture for an embodiment of the invention. The speech recognition system is divided into several levels of operation: a state level, a phone level, a word level, a grammar level, and a system level. Each level is shown in FIGS. 1A-1B as a, interconnected to other levels of the system.

The information passed between different levels or subcircuits of FIGS. 1A-1B is indicated on FIGS. 1A-1B using the following identifiers.

| Identifier | Definition |
| --- | --- |
| grammar_id | Identifies which grammar model is currently being used |
| grammar_node_id | Identifies a node in the grammar model |
| word_id | Uniquely identifies a word |
| wordlat_node_id | Identifies a node in the word lattice |
| LT_id | Lexical tree identifier. Identifies the lexical tree to be used |
| LT_branch_id | Identifies a unique branch in a lexical tree. A branch is defined as all of the monophones subsequent to and including the first monophone in a tree. |
| LT_node_id | Identifies a node in a lexical tree |
| monophone_id | Identifies a monophone |
| transvec_id | Identifies which transition vector to use |
| state_id | Identifies the state |
| phone_no | Unique phone instance identifier |
| prev_phone_no | Phone number of previous phone in network |
| triphone_id | Triphone identifier |
| LML_factor | Language model lookahead factor. The smeared language model score that must be added |

The system level includes a general purpose processor and cache, a system controller, a DMA (direct memory access) controller, clocks, PLL (phased locked loop), GPIO (general purpose I/O interface), timer watch dog, memory interfaces to interface to main memory and non volatile storage, serial, host, debug and display interfaces. The system level also includes a model adaptation engine, a language model factor engine, a speech recognition system controller, a language model interface, and a recognition output interface.

The processor organises the transfer of the various models from the non volatile storage to the various model memories. It handles the language model factor requests. Language model factors are used to by the state level to apply the language model score. The language model (LM) interface provides the mechanism for obtaining LM factors as and when they are needed. The processor keeps a copy of the wave front in memory which is updated simultaneously with that in the wave front manager. Using its copy of the lexical tree, the processor can determine which language model scores may be needed in the coming frames. Once calculated, the language model factors can be kept in memory for use in subsequent frames. The system level is also used for forming speech model adaptation, and acting as an overflow for the various buffers used by the architecture.

The system level includes the audio codec interface and the audio front end interface, connected to the processor via a APB (advanced peripheral bus) to AHB (advanced high performance bus) bridge.

The grammar level includes a grammar engine and grammar model(s). The grammar level sets out the rules of the particular recognition task at the highest level. During system initialisation a number of grammar models might be loaded, for example a command grammar and a dictation grammar. Command mode grammar is a restricted grammar which includes only a very limited lexical tree with command specific words. Some branches of this lexical tree may include multiple words together, where a command has such a structure, e.g. "open file menu". Typically, only a single instance of the lexical tree will be needed. Command mode is used because it can obtain a higher accuracy, due to the lexical tree constraint. In dictation mode grammar, a full lexical tree structure is used.

The grammar may be selected by a user during the recognition process. For example, the command grammar may be selected when the user presses a command button. The architecture supports fast swapping of grammar models. For example, a user may be in the middle of dictating a message when a "punctuation button" is pressed and the phrase "question mark" uttered. At this point, a punctuation grammar could be loaded, in order to increase recognition accuracy.

The word level comprises a word engine, which includes a word lattice and a word graph generator. The word level has two main functions, of keeping a record of the search path at the word level using a word lattice, and interfacing to the language model via a cache. The word lattice is a record of all of the words that have been searched up to the current frame. As new words are searched, they are appended into the lattice at the appropriate place. After the final frame in the current sentence, the n-best word lattice node identifiers from the n-best scoring tokens are passed back to the word lattice. This enables the n-best sentences to be traced back through the lattice. The word lattice can also be post processed to produce a word graph which is essentially a compact version of the word lattice.

At the word level, a record is kept of all tokens that have passed through a word end. This results in a lattice of words. When the final feature vector has been processed, the best scoring token is identified and used to trace back the search path back to the start of the search.

The phone level includes a "phone book" for generating new triphone instances, a wave front manager for sending requests to the phone book to generate new phone instances, a phone request arbiter, and a path merge unit.

The phone book includes a lexical tree, which comprises a vocabulary of words, sounds and/or phrases organised according to the phones or monophones making up the sound. A lexical tree is commonly used in speech recognition rather than a linear lexicon, because it greatly reduces the amount of storage space required to store a word vocabulary, by avoiding duplication of common word beginnings. It is also easier to search when the word beginning is known.

Although it is possible to search a lexical tree based on monophones, it is well known that better results can be achieved in speech recognition by basing the lexical tree search on groups of more than one monophone, since the sound of one syllable commonly affects the pronunciation of the next syllable in the same word, or the first syllable in the next word. In this embodiment, groups of three monophones are used, and these are known as triphones. It is alternatively possible to use a different number of monophones for each group. The phone generator in the "phone book" uses data from the lexical tree to generate triphones.

In one embodiment of the invention, approximately 45 different cued mono-phones are considered. This gives of order 60,000 tri-phones. Each triphone in this embodiment is modelled by a Hidden Markov Model (HMM) with three states. There is no correspondence between individual states and individual phones of the triphone. Alternatively, it is possible to model each triphone by a single state, or by any other number of states.

The phone level is responsible for generating the search space according to the word structure specified in the grammar model and the phone structure specified by the lexical tree. The search space can be envisaged as a wave moving through an acousto-linguistic search space. In order that the wave can be dynamically created, a record of the wave front phone instances must be maintained. This is done in a wave front phone CAM/RAM structure, within the wave front manager. When a token occurs in the final state of a phone instance in the PINE array at the front of the wave, a new phone instance must be generated at the phone level and passed to the PINE array.

The phone instance includes a phone_no, which is a phone instance identifier to identify the phone uniquely in the current search. The phone instance also includes a word lattice node identifier (labelled "word_lat_node_id") to identify the phone's position in the word lattice, state identifiers (labelled "state_ids") for the HMM, storage to hold the tokens as they move through the HMM and LM_factor which is used to by the PINE to apply the language model score. To handle the connectivity between phone instances, a phone instance points to a previous phone instance using the phone_no of the previous phone. This allows tokens to be passed between phones. A "token" is a hypothesised search path, represented by a non-zero score at a particular state, and tokens are propagated through the HMM with each time frame.

The phone instance network can be visualised as a wave with new phone instances being added to the front of the wave, and empty phone instances being removed from the back of the wave. In some circumstances, the back of the wave may be in the same position as the wave front. The back of the wave moves on through the lexical tree as tokens are either moved on or pruned.

Tokens, each representing a particular hypothesis, hop through the states in the HMMs, each hop consuming a feature vector. Each token explores all possible next states which typically involves placing a token in the next state and keeping one in the current state. When there is more than one token in a state, the least likely token can be removed because both have the same word history. When a token reaches the last state of a phone instance at the from of the wave, the next phone instance(s) are requested from the phone level. The phone level uses the lexical tree to create the new phones. As well as looking up the state identification numbers for each HMM state, it also incorporates the correct language model factor.

The language model factor engine is used to smear the language model scores across the lexical tree. This operates in two ways depending on whether the factor is needed for a word start phone(s) or word internal phones. For word internal phones, LM factors can be computed as needed, provided that the LM scores are available in cache. This is because in general the storage requirements for the LM scores are less than the storage of the LM factors for all of the factors in the branch. However when a token is in a word end phone there may a significant number of word start phones e.g. up to (monophones)$^2$ requiring a large amount of computation. To avoid this the LM engine will pre compute word start LM factors when it seems highly likely that a token will be passed to the word starts. These word start LM factors will be held in the LM factors cache. The phone level is responsible for generating the search space according to the word structure specified in the grammar model and the phone structure specified by the lexical tree.

The state level shown in FIG. 1B includes a phone instance network engine (PINE) array, a MHD (Mahalanobis distance) engine, an audio front end, a feature vector buffer for model adaptation, and compressed acoustic models. The state level is the lowest level, in which a network of phones is dynamically created.

The audio input for speech recognition is input to the front end unit of the state level. This audio input may be digital audio, or it may be analog audio which is converted to digital audio using an analog to digital converter. The audio input is divided into time frames, each time frame typically being of the order of 10 ms.

For each audio input time frame, the audio signal is converted into a feature vector. This may be done by splitting the audio signal into spectral components. For example, in the present embodiment, the audio input signal is split into 12 frequency bands and one energy band, and a feature vector is constructed using these 13 components, plus their first and second derivatives, a total of 39 components.

The feature vector is passed to the MHD (Mahalanobis distance) engine. This computes all possible state output likelihoods for the current frame as the state mean and covariance data is read from the acoustic model memory.

The likelihood of each state is determined by the distance between the feature vector and each state. To reduce the number of states, a technique known as "state tying" may be used. Multiple states are grouped together in 39D space, according to their proximity to one another. An average or central value from each group is used to represent the entire group. Thus, the effective number of states may be reduced from 40,000 to 8,000. The accuracy may be improved using a language model in addition to the word recognition lexical tree. A language model is based on the probability of sequential words. The above figure of 8,000 states gives best recognition results when used with a language model.

The MHD (Mahalanobis Distance) is a distance between two N-dimensional points, scaled by the statistical variation in each component. In embodiments of the invention, the Mahalanobis distance between the feature vector and each state is calculated, to determine similarity of the feature vector to each state.

The Feature Vector represents a point in an N-dimensional space. Different embodiments of the invention may use different values of N. Generally we see values of N in the range of 20 to 39, although values outside this range are not excluded.

The distance calculator stage of the recognition process computes a probability or likelihood that a feature vector corresponds to a particular state. Each state has an associated probability distribution in the N-dimensional space. The distance calculator computes the distance in the N-dimensional space from the Feature Vector to the probability distribution for each state. In some embodiments, the calculation is performed only when the search stage algorithms determine that the distance for that particular state is needed by the search stage. In some embodiments, the distances for all of the states are calculated and made available to the search stage, which allows pipelined operation. Embodiments that do the calculations on demand are preferable.

The Mahalanobis Distance (MHD) is extensively described in the literature. It may be calculated using the formula $$\text{MHD value} = \ln(P(x)) = -0.5[N^*\ln(2^*pi) + \ln|Cov|] + (-0.5^*[(x-u)'^*\text{inverse}(Cov)^*(x-u)])$$

where
N=number of dimensions in the space
x=feature vector, a point in the N dimensional space
u=mean vector
Cov=covariance matrix
|Cov|=determinant of covariance matrix
(a)'=transpose of matrix a Different embodiments may use variations on this equation, for example the base for the logarithm is not always the natural base e that is used in the above example. The log of the probability is preferably calculated, rather than the probability, as it simplifies the implementation. Not all embodiments do this. In alternative embodiments, the likelihoods rather than probabilities are computed as it leads to simpler implementations of computations in the search stage.

The feature vector is used to calculate 8,000 MHD distances for each time frame, i.e. one distance for each of the 8,000 states. It is beneficial, although not essential, to perform the MHD calculations separately in a pre-processor, known as a MHD engine, because MHD calculation is a computationally intensive process.

Due to the 10 ms frame length, a feature vector arrives at the MHD engine of the state level every 10 ms. The MHD engine calculates the likelihood of each feature vector corresponding to each of a number of states derived from an acoustic model. Each state is also a 39 dimensional vector, having the same spectral components as the feature vector. The MHD engine calculates the difference in 39-D space between the feature vector and each state to obtain the likelihood for that state. A parallel MHD or a single MHD arrangement may be used.

The feature vectors may be sent to a feature vector buffer for model adaptation, which determines whether the observed features fit well with the acoustic model, and may initiate an adaptation of the model if the fit is not sufficiently good.

Scores indicating the state likelihoods or probabilities are output from the MHD engine to the PINE array. It is preferable to use likelihoods rather than probabilities, because likelihoods can be added together to give a total likelihood. Probabilities must be multiplied, which can give rise to rounding errors. In this embodiment, eight separate pines are used, each of 4 kilobytes, thus storing 4000 phones per pine.

During recognition, the Phone Instance Network Engine (PINE) Array will contain a network of phone instances. Tokens representing search hypotheses in the form of a probability (likelihood) will exist in some of the HMM states of the phone instances. The tokens are propagated into all available states and updated with the corresponding state output probabilities. Maximum model, word end and beam pruning are applied to the tokens to ensure the search space is kept bounded. When a token is in the final state of a phone model and has avoided being pruned, the PINE makes a next phone request to the Phone level. The PINE array may receive a number of new phone models from the phone level which must be appended to the appropriate existing phone.

Figure 2A:
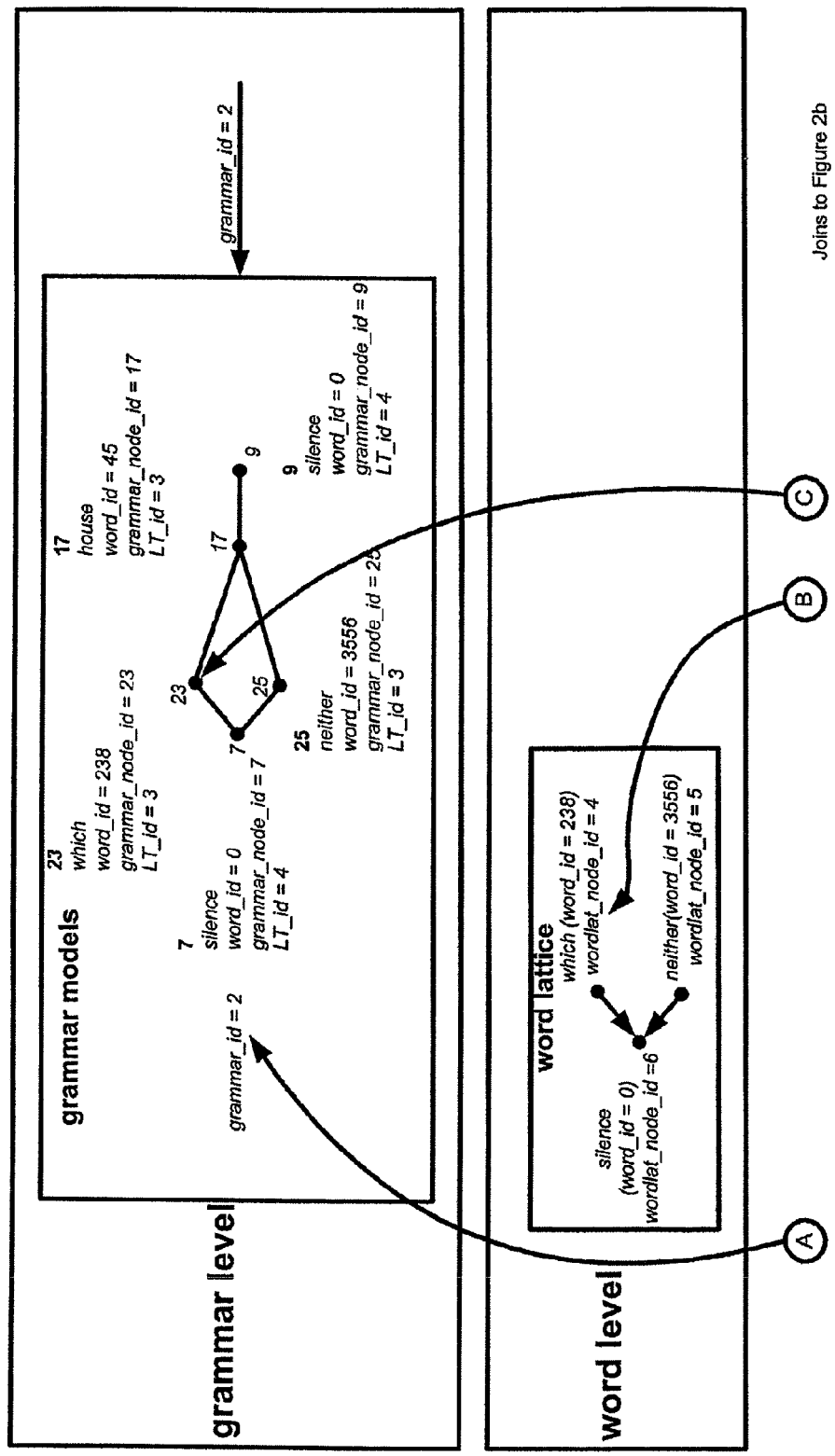
FIGS. 2A-2B are a block diagram showing the main data structures used in the speech recognition apparatus of FIGS. 1A-1B.
Figure 2B:
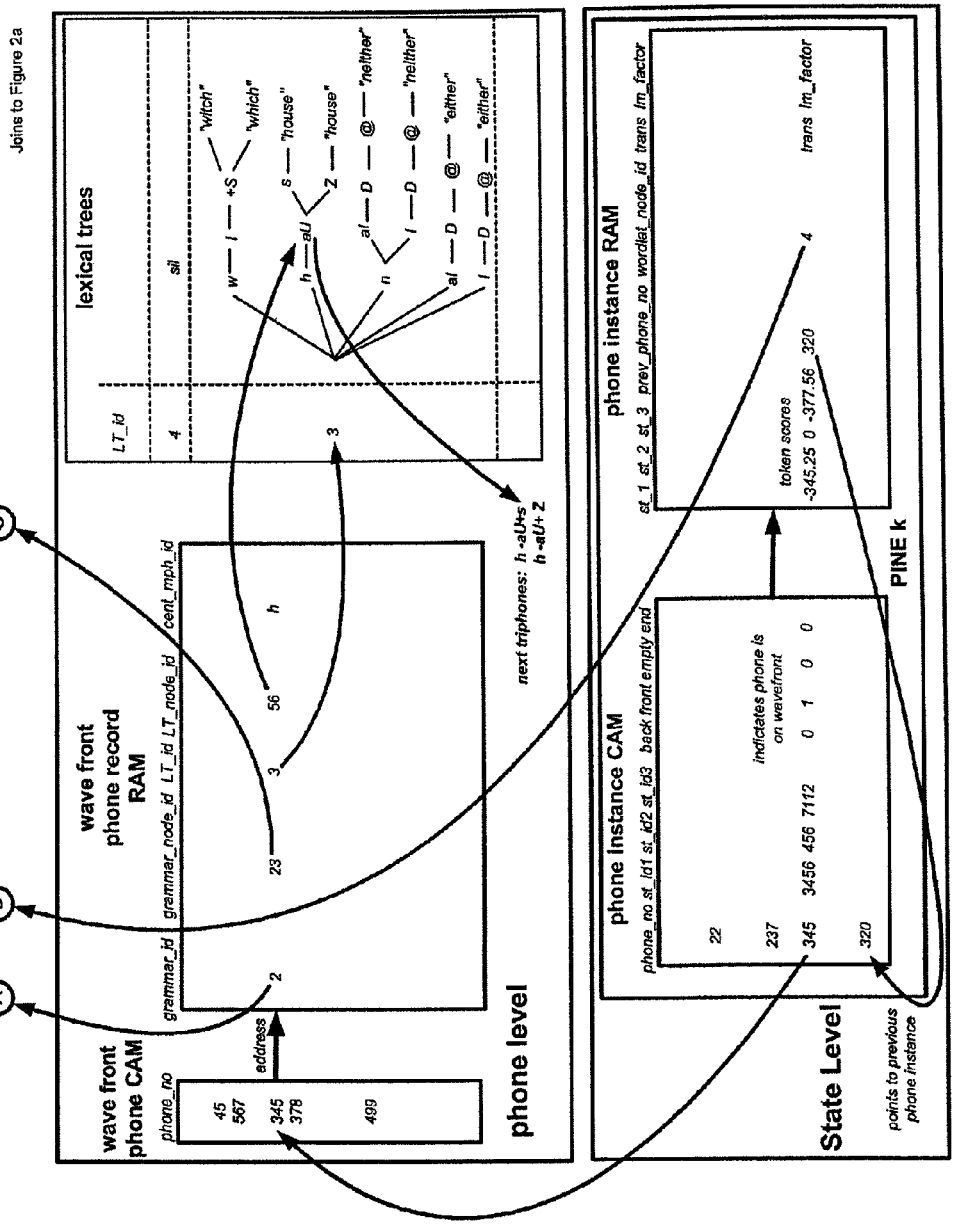

FIG. 2B shows the data structures stored in the PINE array, and other main data structures used during the acoustic search. Each PINE includes a phone instance CAM and a phone instance RAM. The phone instance CAM stores the phone instance number (labelled "phone_no") which uniquely identifies each phone instance. The phone instance CAM also stores the state IDs of the three HMM states used to model the phone, and flags indicating the position of the phone. The "back" flag indicates if the phone is at the back of the wavefront. The "front" flag indicates if the phone is at the front of the wavefront. The "empty" flag indicates if there are no tokens in any of the three states for that phone. The "end" flag indicates if the phone is at the end of a word.

The phone instance RAM stores the token scores for each of the three states corresponding to each phone. The st_dum field indicates a dummy state, which is used to represent a state prior to the first state of the first phone. The "tmp" field is used for passing a token from a previous phone in the lexical tree to the current phone. This will be explained in more detail later. The prev_phone_no field is for storing a pointer to the previous phone instance in the network. The wordlat_node_id identifies the position of the phone instance on the word lattice node, and the LM_factor stores the language model factor for that phone instance.

At the phone level a record of all phones on the wave front must be maintained. If a phone instance is on the wave front, the phone_no stored in the phone instance CAM will point to the details in the wave front phone CAM and RAM.

The wave front phone CAM and RAM keeps pointers into the grammar and lexical tree. When a token in a wave front phone reaches the last state, the PINE array makes a request to the phone level by passing back the phone_id. The phone_id is used as a key to determining the token's grammer_node_id and LT_node_id within the wave front CAM/RAM structure. If the token is at a word end the grammar model is checked. A grammar identifier points to the type of grammar.

At the word level, FIGS. 2A-2B show an example word lattice structure, with silence having a word_id of 0, and a wordlat_node_id of 6. This is shown as connected to two word nodes—"which" has a word_id of 238 and a wordlat_node_id of 4, and "neither" has a word_id of 3556 and a wordlat_node_id of 5.

At the highest level, i.e. the grammar level, a simple grammar model is shown which will allow the phrase 'silence which house silence' or 'silence neither house silence' to be spoken. Whenever a word end is reached during the search, the grammar model must be consulted to determine the next possible word(s) or lexical tree(s). This allows the word lattice at the word level, consisting of a network of words, to be assembled. Whenever a word end is reached, the word is added to the lattice and the wordlat_node_id updated accordingly.

Figure 3A:
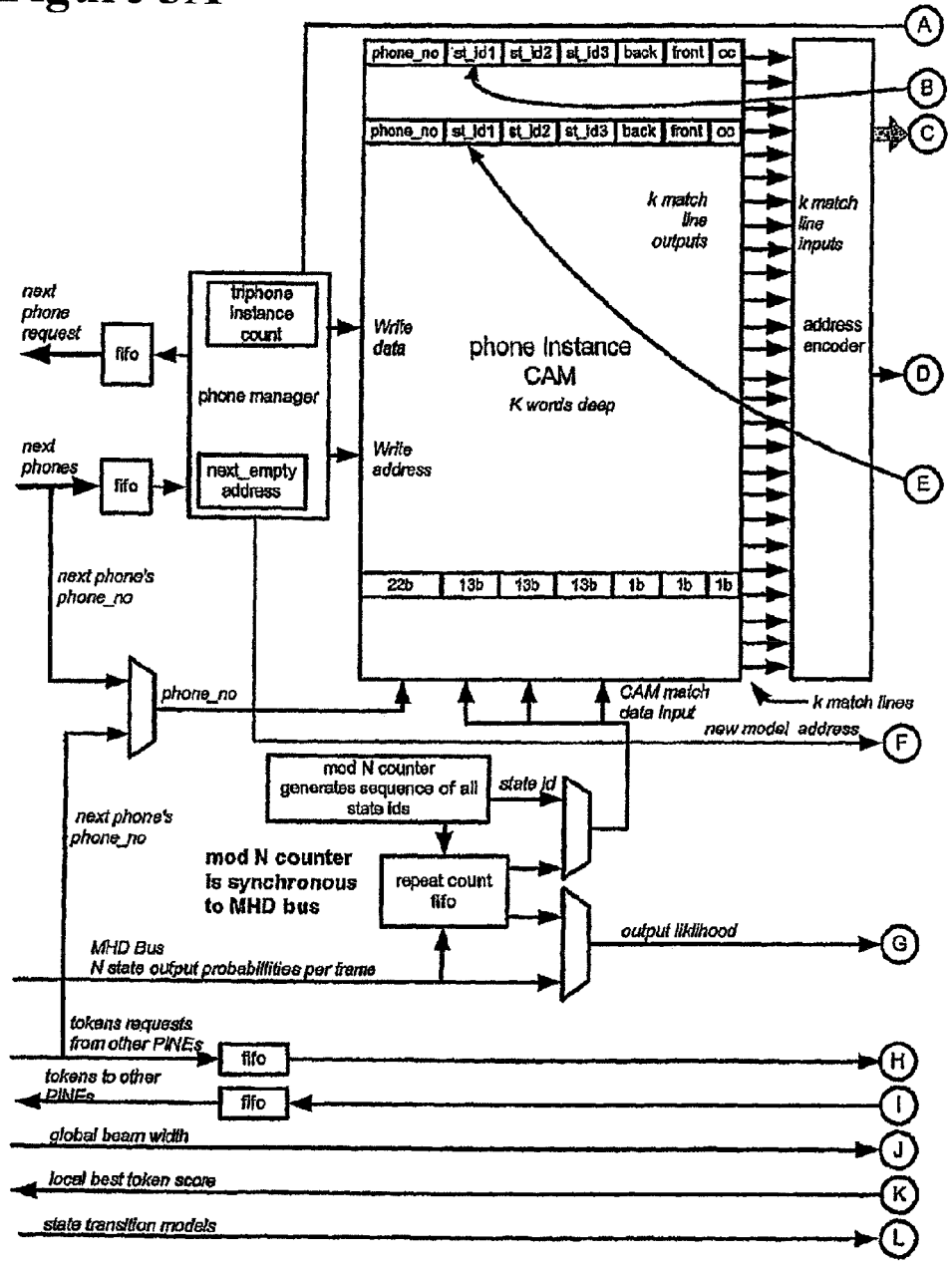
FIGS. 3A-3B show a block diagram of the Single Phone Instance Network. Engine (PINE) of FIG. 1B.
Figure 3B:
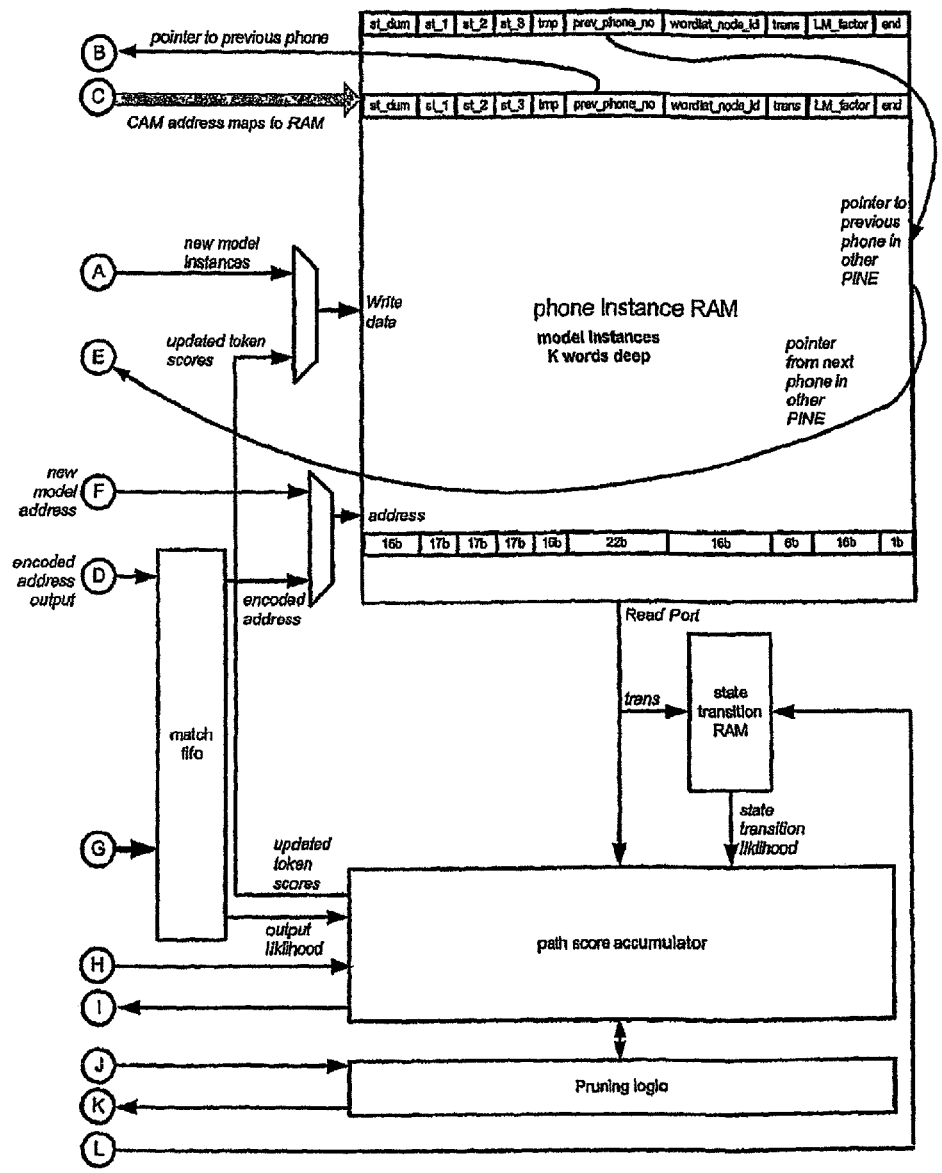

FIGS. 3A-3B show a single phone instance network engine (PINE). At system power up the state transition RAM will be loaded with the appropriate state transition vector but the CAM and RAM memories will be empty. When the system is initialised an initial set of phone model(s) will be instantiated with a token in the dummy state and a path score of zero. The phone models are received from the phone level.

When the audio data is processed, a stream of all possible state output probabilities will be received from the MHD engine. A counter that is synchronous to the stream of state output probabilities from the MHD produces a concurrent stream of state_ids. The job of the CAM is to perform a search to see if the state_id is instantiated anywhere in the CAM state_id fields. If it exists and the location doesn't have its empty flag set then this indicates that a token may need to be updated. The match signal from the CAM must be encoded into an address for the RAM. The corresponding RAM address can then be read. Any token that will end up in the identified state can then have it's path score updated and including any transition vector likelihood.

It is possible that a single state_id generates multiple CAM matches. To handle this situation the CAM and RAM are effectively decoupled by means of a match fifo and repeat count fifo. The state_id and corresponding state_output_probability are stored in the repeat count fifo. During a subsequent frame when there is no match, this state_id can be revisited, ignoring the matches already dealt with.

All searched phone instances corresponding to words in the current possible lexical tree are stored in the CAM-RAM. This includes phone instances at the beginning of the word, middle of the word and end of the word. These phone instances are connected by the "previous phone instance" field, which allows traceback through an entire word within the CAM-RAM.

A mechanism is thus required to pass tokens from one phone instance to the next. This mechanism is provided by the tmp field in the RAM.

The tmp field in the RAM holds tokens during token passing.

At the start of each time frame, the audio input is converted into a feature vector, the MHD values calculated, and the MHD values used to update the token scores. After update of all tokens, 2 passes are made through the CAM-RAM, firstly for pruning, and then for token passing. The pruning in this example removes tokens of below a threshold score, although other types of pruning are also possible. The pruning may involve removing a predetermined proportion of the tokens, chosen as those of lowest likelihood. A third possible method of pruning is removing all tokens with scores below a first predetermined value, but at word ends removing all tokens with scores below a second predetermined value, the second predetermined value being greater than the first predetermined value.

The token passing works as follows. Each phone instance points back to a previous phone, due to the prev_phone_no field stored in the RAM. During the token passing, the third token of a previous phone is grabbed and put into the tmp field of the current phone.

In other words, if a token is on the third state, and it is not pruned, it must enter the next state of the next phone. To do this, the tokens that lie in the third state are moved across to the tmp field.

For example, phone no. 345 needs to look at phone no. 320 to see if any tokens are in the third state. If yes, it takes these tokens and puts them in the tmp field.

One field in the CAM is labelled "front". This indicates whether the phone is on the wave front. If the phone is not on the wave front, then another phone will have picked up the token in the third state. However, if the phone is on the wave front, then no other phone will have picked up the token on the third state. Therefore, if there is a token in the third state, and the phone is on the wavefront, it is necessary to generate a next phone request.

The current phone number, word lattice identifier and word end flag are sent to the wave front manager, to request a next phone. If the word end flag indicates a word end, then the score is also passed to the wave front manager. The score can be passed in any case, but it is only required at a word end.

The phone level generates the next phone or phones. A new phone instance starts, and all of state1, state2 and state3 have scores pre-set to zero. The old score is provided in the tmp field.

The old phone is still within the wave, but it is unlikely to be at the back of the wave at this stage. When it gets to the back of the wave, it is deleted. Until it gets there, it remains in the CAM-RAM as before. The third token remains where it was, since tokens can either stay in the third state or move on.

Note that it is possible to end up with more that one token in each state. If this occurs, then the token with the poorer score is deleted. This does not affect the result of the lexical tree search, because both tokens on the same state have exactly the same word history.

Figure 4:
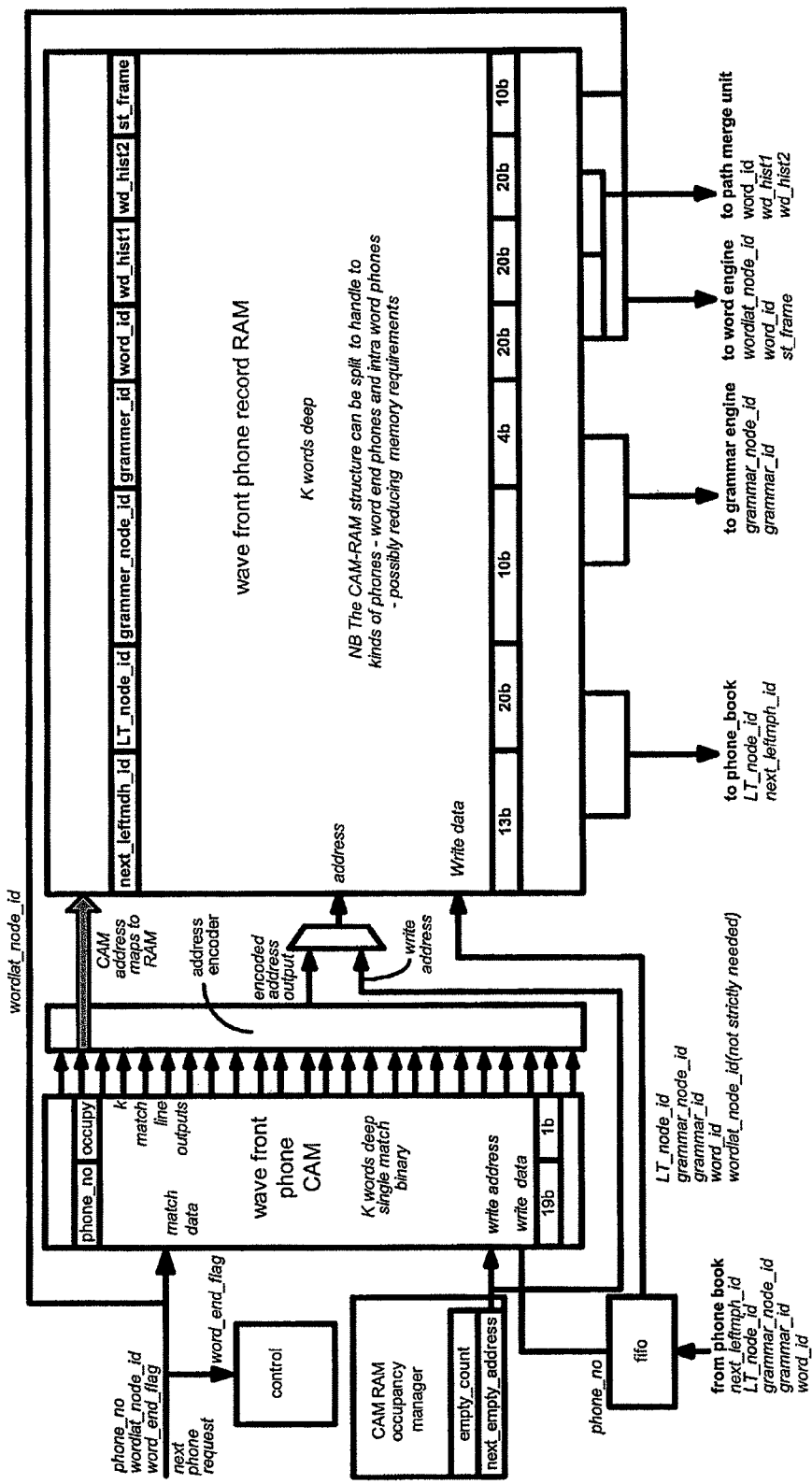
FIG. 4 is a block diagram showing the Wave Front Manager architecture.

FIG. 4 shows a block diagram of the wave front manager. The wave front manager is responsible for maintaining a record of the set of phone models that exist at the front of the acoustic search space. This set of phone models is referred to as the "wave front." The key requirement for this block as to minimise the time between receiving a "next phone request" and generating the appropriate responses. The wave front manager receives the next phone requests from the PINE array and generates appropriate responses for the Phone Book, Word Engine, Path Merge Unit and Grammar engine The wave front manager also receives new wave front phone models from the Phone Book and updates the wave front.

The wave front manager receives the next phone request from the PINE array, via the phone request arbiter. The next phone request consists of a phone_no, word_end_flag and wordlat_node_id. If this phone is at the end of a word, the word_end_flag will be set.

The wave front manager uses the phone_no as input to the wave front phone CAM. As each phone_no is unique, it is guaranteed that only a single match will be generated. The wave front manager uses the CAM generated address to access the RAM. It then sends retrieved data from the RAM to the phone book, grammar engine, Path Merge Unit and word engine.

The wave front manager removes phone instance from CAM and RAM by writing 0's into CAM and RAM, and increments the empty count by one.

Sometime later, the wave front manager receives new phone instances from the phone book and place them in a fifo. The phone instances are taken from the fifo and written into the CAM and RAM at the next_empty_address. The empty_count is decremented by one. A match is run on the "occupy" flag, and the address is placed into next_empty_address register.

Figure 5:
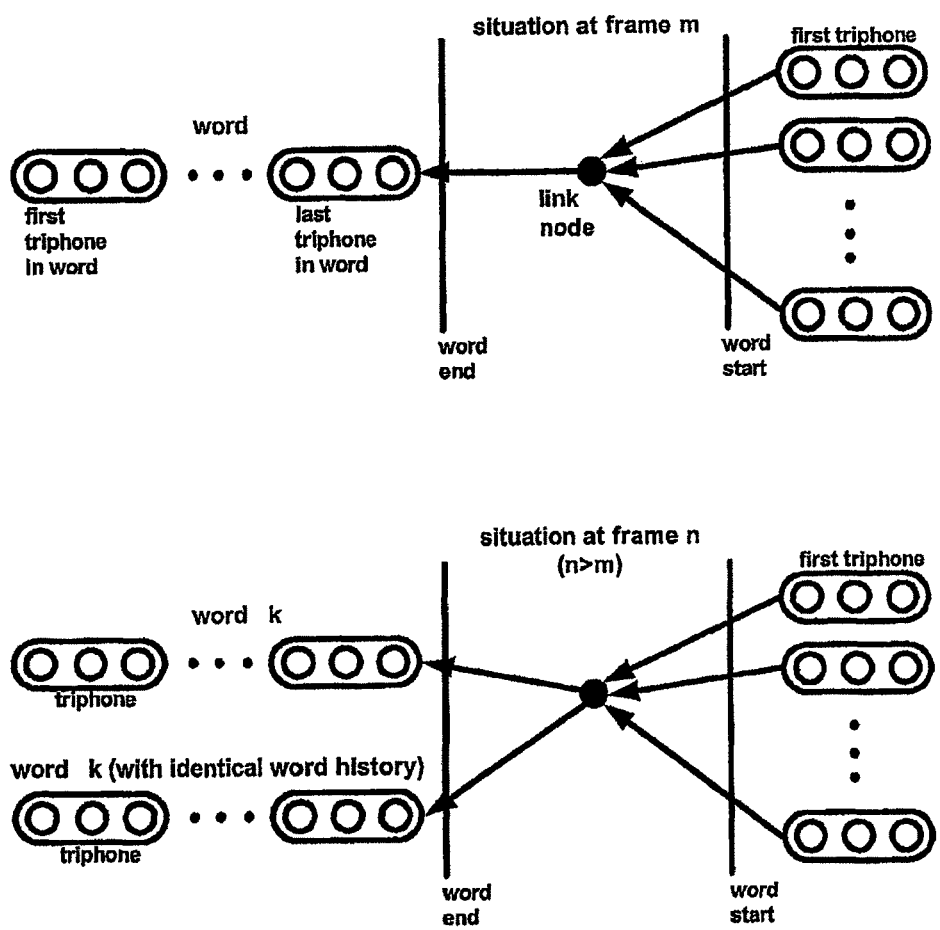
FIG. 5 shows the use of link nodes to permit path merging.

Both the phone level and the state level make use of a path merge unit to reduce the number of possible paths, by path merging. FIG. 5 shows the use of link nodes to permit path merging. In the present embodiment, all word end phone instances are linked to word start triphones with a link node. During each frame the path merge unit looks for word end tokens that can be recombined. This is done by looking for word end phones that have the same word_id and word history. When they are found a link is added using the path merge unit in the PINE array.

Figure 6:
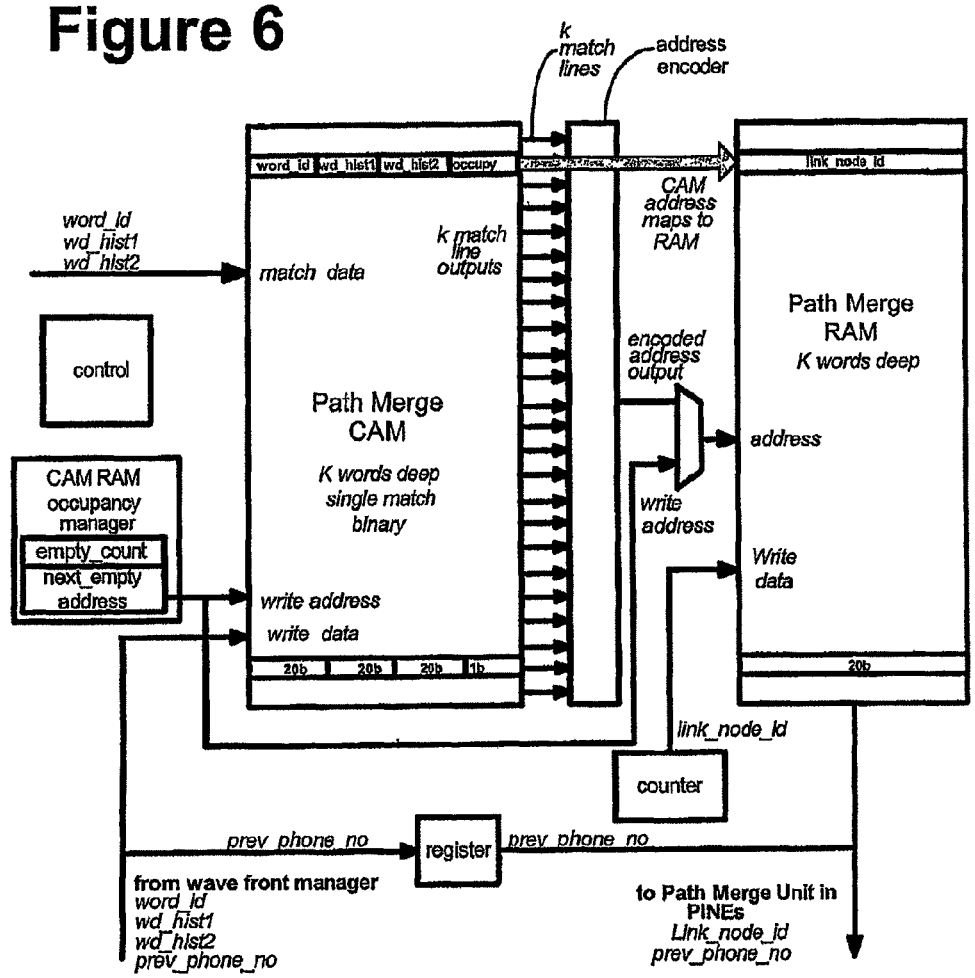
FIG. 6 shows a block diagram of a Path Merge Unit in the Phone Level.

FIG. 6 shows a diagram of the architecture at the Phone level, showing the path merge unit. The path merge unit includes a path merge CAM and a path merge RAM. The path merge CAM stores word_id, word history for two words, and an "occupy" field. The path merge RAM stores a link_node_id. A CAM RAM occupancy manager keeps track of the empty addresses in the CAM and RAM. The path merge unit is only passed information from the wave front manager if the phone is a word end phone. For each frame, there is a check to see if there is an identical word with the same history, and if there is, the link_node_id is passed to the path merge unit. If there isn't an identical word with the same history, a new record is written into the Path merge CAM-RAM.

Figure 7:
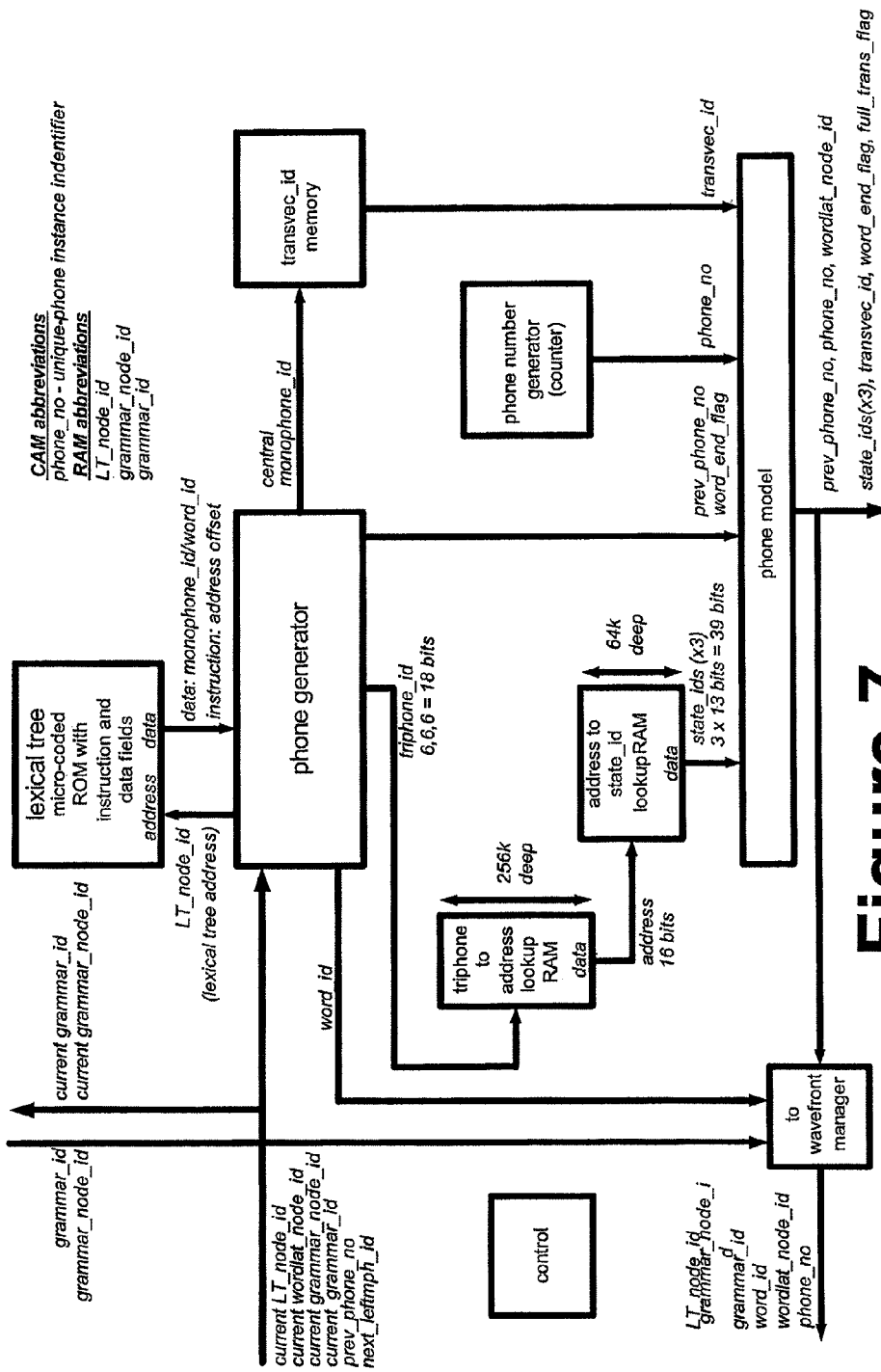
FIG. 7 shows the Phone Book architecture.

FIG. 7 is a block diagram showing the Phone Book architecture. The Phone Book is tasked with generating the next phone models when given a pointer into the lexical tree. The key requirement for this block as to minimise the time between receiving a "lexical tree address" and generating the appropriate responses, in particular the next phone model instance(s).

The lexical tree is used to build the next triphones based on the current context.

| Current triphone | Next triphone | comments |
|---|---|---|
| Left context = a | discarded | next_leftmph_id stored in wave front manager |
| Central context = b | Left context = b | current LT_node_id stored in wave front manager must be looked up. Large (<45) for new word start |
| Right context = c | Central context = c | |
| | Right context = ? | |

The LT_node_id, next_left_mphid and prev_phone_no are received at the phone generator from the wavefront manager. The LT_node_id is then used to address the lexical tree store and return the central monophone_id. One or more further accesses to memory are performed using the microcoded instructions, each memory access returning the right monophone_id.

A two stage lookup is accessed using the three monophone_ids (giving a triphone), the associated state_ids. The phone model is assembled, and returned to the PINE array. The wavefront manager is then updated by sending it relevant parts of the phone model.

The lexical tree store is a micro-coded ROM with both instruction and data fields. The lexical tree store holds a number of lexical trees. Each lexical tree may hold single words or multiple words. Each lexical tree comprises lexical tree elements, and each element has three fields. For now, the fields will be integers and will be converted to std_logic_vector later. The following is an example of the lexical tree store, with the LT data in word_id order.

| ZERO | z iy r ow | 19 8 12 11 0 0 0 0 | sp 0 |
|---|---|---|---|
| ONE | w ah n | 18 2 1 0 0 0 0 0 | sil 1 |
| TWO | t uw | 14 16 0 0 0 0 0 0 | ah 2 |
| THREE | th r iy | 15 12 8 0 0 0 0 0 | ay 3 |
| FOUR | f ow r | 6 11 12 0 0 0 0 0 | eh 4 |
| FIVE | f ay v | 6 3 17 0 0 0 0 0 | ey 5 |
| SIX | s ih k s | 13 7 9 13 0 0 0 0 | f 6 |
| SEVEN | s eh v ih n | 13 4 17 7 10 0 0 0 | ih 7 |
| EIGHT | ey t | 5 14 0 0 0 0 0 0 | iy 8 |
| NINE | n ay n | 10 3 10 0 0 0 0 0 | k 9 |
| OH | ow | 11 0 0 0 0 0 0 0 | n 10 |
| | | | ow 11 |
| | | | r 12 |
| | | | s 13 |
| | | | t 14 |
| | | | th 15 |
| | | | uw 16 |
| | | | v 17 |
| | | | w 18 |
| | | | z 19 |

The following shows the LT data in MP (monophone) start order.

| EIGHT | ey t | 5 14 0 0 0 0 0 0 |
|---|---|---|
| FIVE | f ay v | 6 3 17 0 0 0 0 0 |
| FOUR | f ow r | 6 11 12 0 0 0 0 0 |
| NINE | n ay n | 10 3 10 0 0 0 0 0 |
| OH | ow | 11 0 0 0 0 0 0 0 |
| SEVEN | s eh v ih n | 13 4 17 7 10 0 0 0 |
| SIX | s ih k s | 13 7 9 13 0 0 0 0 |
| TWO | t uw | 14 16 0 0 0 0 0 0 |
| THREE | th r iy | 15 12 8 0 0 0 0 0 |
| ONE | w ah n | 18 2 1 0 0 0 0 0 |
| ZERO | z iy r ow | 19 8 12 11 0 0 0 0 |

The following is an example of the three fields of a lexical tree element. The first field is an instruction field, and the second and third fields are data fields.

Fields:

| 1st | 2nd | 3rd | |
|---|---|---|---|
| instr | data | data | |
| 2b | 6b | 6b | |
| 00 | MP | MP | raw data field. |
| 01 | br | br | branch address. |
| 10 | br | br | branch address. |
| 11 | word_id | | double field. |

Note that there might be no difference between "01" and "10"

To build the "ey" tree, we only have to consider "EIGHT", because this is the only word in the lexical tree which starts with "ey". EIGHT is represented as "ey t", with phone_nos 5 14 0 0 0 0 0 0. The first lexical tree element stores the raw data specifying the phone_nos, the second lexical tree element is an end field, and the subsequent lexical tree element is set to zero.

| 0 00 5 14 | raw data |
|---|---|
| 1 11 8 0 | end field |
| 2 00 0 0 | |

To build the "f" tree, we have:

| FIVE | f ay v | 6 3 17 0 0 0 0 0 |
|---|---|---|
| FOUR | f ow r | 6 11 12 0 0 0 0 0 |

| 0 01 4 0 | branch forward four places as well |
|---|---|
| 1 00 6 3 | as the implied other brach of next (one). |
| 2 00 3 17 | |
| 3 11 5 0 | all addresses are relative offsets. |
| 4 00 6 11 | |
| 5 00 11 12 | |
| 6 11 4 0 | |
| 7 00 0 0 | |

To build the "n" tree, we have:

| NINE | n ay n | 10 3 10 0 0 0 0 0 |
|---|---|---|

| 0 00 10 3 |
|---|
| 1 00 3 10 |
| 2 11 9 0 |
| 3 00 0 0 |

To build the "ow" tree, we have "ow" in both the first and second data fields, as no tree is going to be a single monophone long.

| OH | ow | 11 0 0 0 0 0 0 0 |
|---|---|---|

| 0 11 11 0 |
|---|
| 1 00 0 0 |

To build the "s" tree, we have:

| SEVEN | s eh v ih n | 13 4 17 7 10 0 0 0 0 |
|---|---|---|
| SIX | s ih k s | 13 7 9 13 0 0 0 0 |

```
0 0 1 6 0          branch forward six places.
1 00 13 4
2 00 4 17
3 00 17 7
4 00 7 10
5 11 7 0
6 00 13 7
7 0 0 7 9
8 00 9 13
9 11 6 0
10 00 0 0
```

To build the "t" tree, we have:

| TWO | t uw | 14 16 0 0 0 0 0 0 0 |
|---|---|---|

```
0 00 14 16
1 11 2 0
2 0 0 0 0
```

To build the "th" tree, we have:

| THREE | th r iy | 15 12 8 0 0 0 0 0 0 |
|---|---|---|

```
0 00 15 12
1 00 12 8
2 11 3 0
3 00 0 0
```

To build the "w" tree, we have:

| ONE | w ah n | 18 2 1 0 0 0 0 0 0 |
|---|---|---|

```
0 00 18 12
1 00 12 10
2 11 1 0
3 00 0 0
```

To build the "z" tree, we have:

| ZERO | z iy r ow | 19 8 12 11 0 0 0 0 0 |
|---|---|---|

```
0 00 19 8
1 00 8 12
2 00 12 11
3 11 0 0
4 00 0 0
```

Once all of the branches have been built, the next stage is to concatenate the tree. It appears that four elements make a page, and each element is two bytes.

|  |  | page |
|---|---|---|
| ey: | 00 5 14 11 8 0 00 0 0 0 0 0 | 5 |
| f: | 01 4 0 00 6 3 00 3 17 11 5 0 | 6 |
|  | 00 6 11 00 11 12 11 4 0 0 0 0 | 7 |
| n: | 00 10 3 00 3 10 11 9 0 0 0 0 | 8 |
| ow: | 11 11 0 0 0 0 0 0 00 0 0 0 | 9 |
| s: | 01 6 0 00 13 4 00 4 17 00 17 7 | 10 |
|  | 00 7 10 11 7 0 00 13 7 00 7 9 | 11 |
|  | 00 9 13 11 6 0 00 0 0 0 0 0 | 12 |

|  |  | page |
|---|---|---|
| t: | 00 14 16 11 2 0 00 0 0 0 0 0 | 13 |
| th: | 00 15 12 00 12 8 11 3 0 00 0 0 | 14 |
| w: | 00 18 12 00 12 10 11 1 0 00 0 0 | 15 |
| z: | 00 19 8 00 8 12 00 12 11 11 0 0 | 16 |

Then, the start_lookup header is defined. Each row (page) is 8 bytes and hence the header takes 3 rows. The end_lookup header is two rows. Therefore, the lexical tree store proper starts at the 6th (#5) page.

| sp | sil | ah | ay | eh | ey | f | ih | MP |
|---|---|---|---|---|---|---|---|---|
| 0 | 1 | 2 | 3 | 4 | 5 | 6 | 7 | MP_id |
| 3 | 0 | 0 | 0 | 5 | 0 | 6 | 0 | data stored. |
| iy | k | n | ow | r | s | t | th |  |
| 8 | 9 | 10 | 11 | 12 | 13 | 14 | 15 |  |
| 0 | 0 | 8 | 9 | 0 | 10 | 13 | 14 |  |
| uw | v | w | z | . | . | . | . |  |
| 16 | 17 | 18 | 19 | . | . | . | . |  |
| 0 | 0 | 15 | 16 | 0 | 0 | 0 | 0 |  |

The end_lookup header is defined. 20 is out of bounds.

| ey | f | n | ow | s | t | th | w |
|---|---|---|---|---|---|---|---|
| 5 | 6 | 10 | 11 | 13 | 14 | 15 | 18 |
| z | . | . | . | . | . | . | . |
| 19 | 20 | 20 | 20 | 20 | 20 | 20 | 20 |

To put the above information all together:

```
START    sp: ih   3 0         0 0         5 0         6 0         0
LOOKUP   iy: th   0 0         8 9         0 10        13 14       1
         uw: v    0 0         15 16       0 0         0 0         2
END      ey: w    5 6         10 11       13 14       15 18       3
LOOKUP   z        19 20       20 20       20 20       20 20       4
LEXICAL  ey:      00 5 14     11 8 0      00 0 0      00 0 0      5
TREE     f:       01 4 0      00 6 3      00 3 17     11 5 0      6
STORE             00 6 11     00 11 12    11 4 0      00 0 0      7
         n:       00 10 3     00 3 10     11 9 0      00 0 0      8
         ow:      11 11 0     00 0 0      00 0 0      00 0 0      9
         s:       01 6 0      00 13 4     00 4 17     00 17 7     10
                  00 7 10     11 7 0      00 13 7     00 7 9      11
                  00 9 13     11 6 0      00 0 0      00 0 0      12
         t:       00 14 16    11 2 0      00 0 0      00 0 0      13
         th:      00 15 12    00 12 8     11 3 0      00 0 0      14
         w:       00 18 12    00 12 10    11 1 0      00 0 0      15
         z:       00 19 8     00 8 12     00 12 11    11 0 0      16
```

```
3 0         0 0         5 0         6 0
0 0         8 9         0 10        13 14
0 0         15 16       0 0         0 0
5 6         10 11       13 14       15 18
19 20       20 20       20 20       20 20
00 5 14     11 8 0      00 0 0      00 0 0
01 4 0      00 6 3      00 3 17     11 5 0
00 6 11     00 11 12    11 4 0      00 0 0
00 10 3     00 3 10     11 9 0      00 0 0
11 11 0     00 0 0      00 0 0      00 0 0
01 6 0      00 13 4     00 4 17     00 17 7
00 7 10     11 7 0      00 13 7     00 7 9
00 9 13     11 6 0      00 0 0      00 0 0
00 14 16    11 2 0      00 0 0      00 0 0
00 15 12    00 12 8     11 3 0      00 0 0
00 18 12    00 12 10    11 1 0      00 0 0
00 19 8     00 8 12     00 12 11    11 0 0
```

This information is converted to hexidecimal. The first five are byte fields.

The rest are:

|  | 2bit - uCode. | | |
|---|---|---|---|
|  | 6bit - data. | | |
|  | 2bit - null. | | |
|  | 6bit - data | | |
| 03 00 | 00 00 | 05 00 | 06 00 |
| 00 00 | 08 09 | 00 0A | 0D 0E |
| 00 00 | 0F 10 | 00 00 | 00 00 |
| 05 06 | 0A 0B | 0D 0E | 0F 12 |
| 13 14 | 14 14 | 14 14 | 14 14 |
| 05 0E | C8 00 | 00 00 | 00 00 |
| 84 00 | 06 03 | 03 11 | C5 00 |
| 06 0B | 0B 0C | C4 00 | 00 00 |
| 0A 03 | 03 0A | C9 09 | 00 00 |
| CB 00 | 00 00 | 00 00 | 00 00 |
| 86 00 | 0D 04 | 04 11 | 11 07 |
| 07 0A | C7 00 | 0D 07 | 07 09 |
| 00 0D | C6 00 | 00 00 | 00 00 |
| 0E 10 | C2 00 | 00 00 | 00 00 |
| 0F 0C | 0C 08 | C3 00 | 00 00 |
| 12 0C | 0C 0A | C1 00 | 00 00 |
| 13 08 | 08 0C | 0C 0B | C0 00 |

The above is the micro code for the digit lexical tree. It allows branching, and it holds the word_id. It knows which lexical trees it contains and where they are housed. It also stores the possible end monophone list.

Figure 8A:
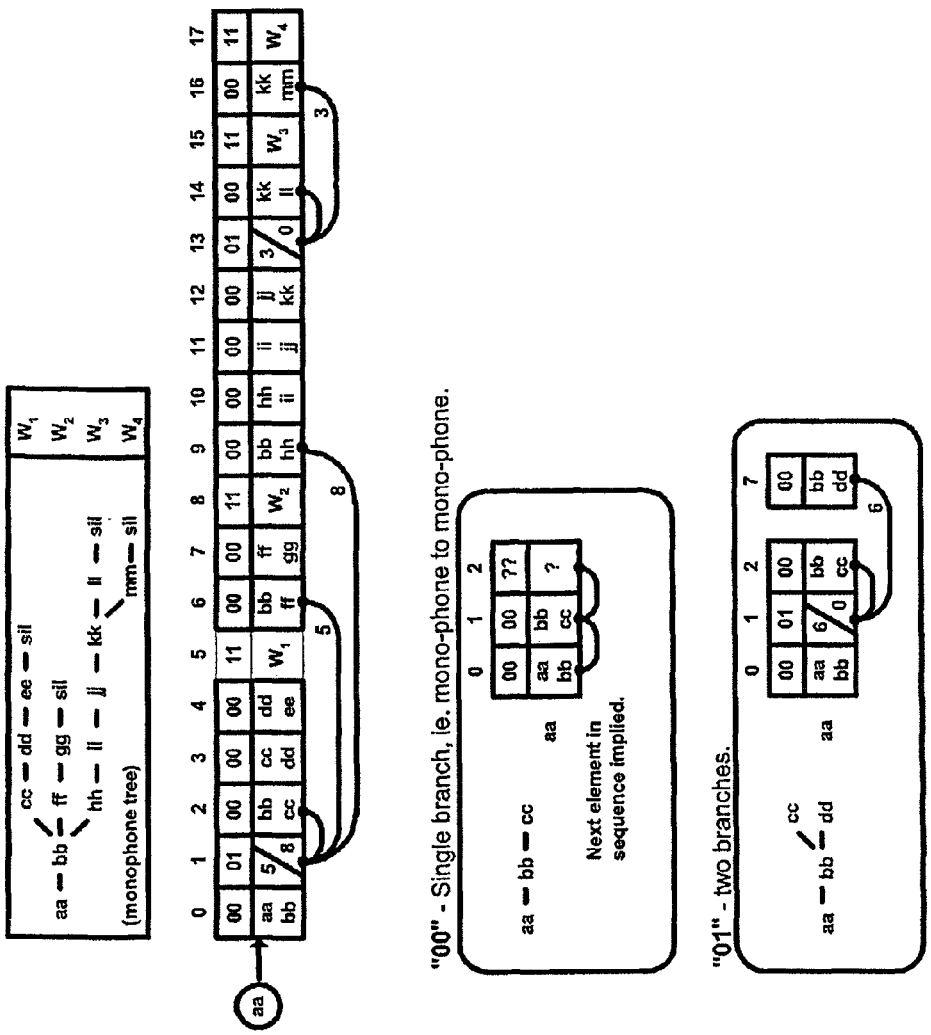
FIGS. 8A-8B show Lexical tree storage.
Figure 8B:
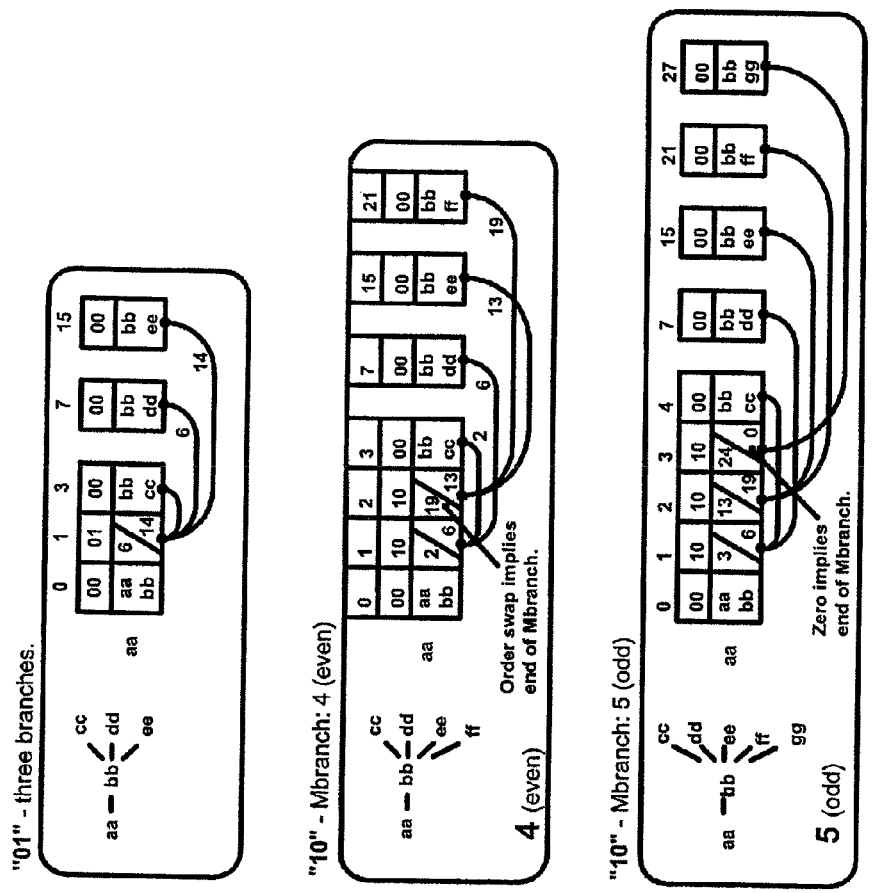

FIGS. 8A-8B show a further example of the Lexical Tree RAM, giving examples of different types of branching in the lexical tree, and how these are represented in the RAM.

Figure 9:
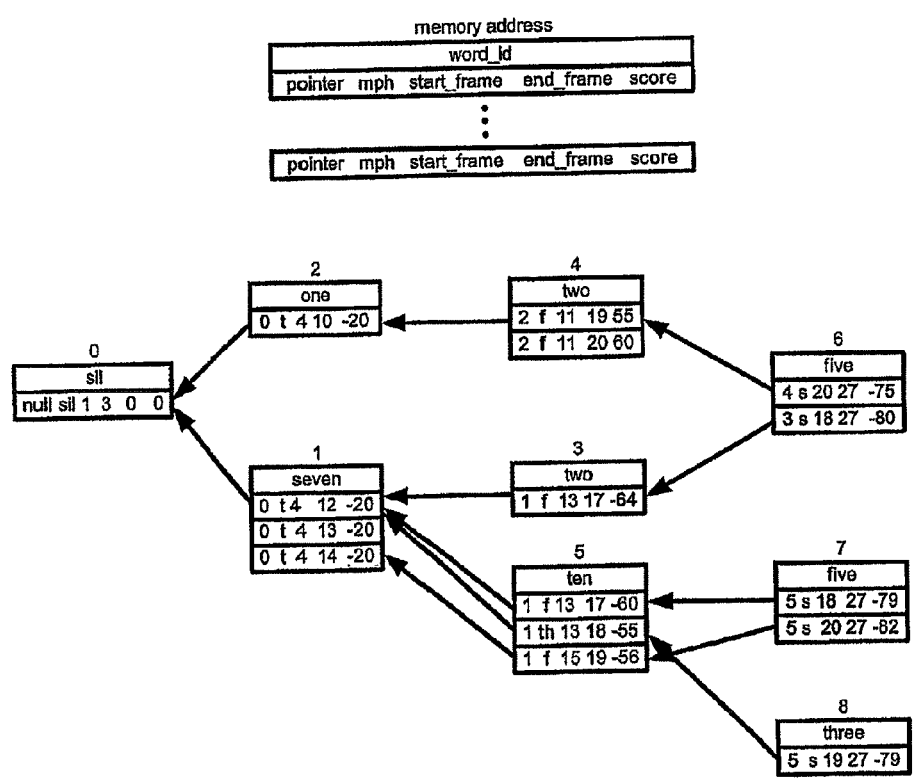
FIG. 9 shows the data structure for the word link record.

FIG. 9 is a block diagram showing the data structure that is supported for the word link record, to enable word n-best decoding. The word engine maintains a record of the words that have been currently searched by the PINE array. It is used to determine the word history and allow trace back during or at the end of search. The word history is needed to determine the language model score and whether particular paths can be recombined or merged.

Figure 10:
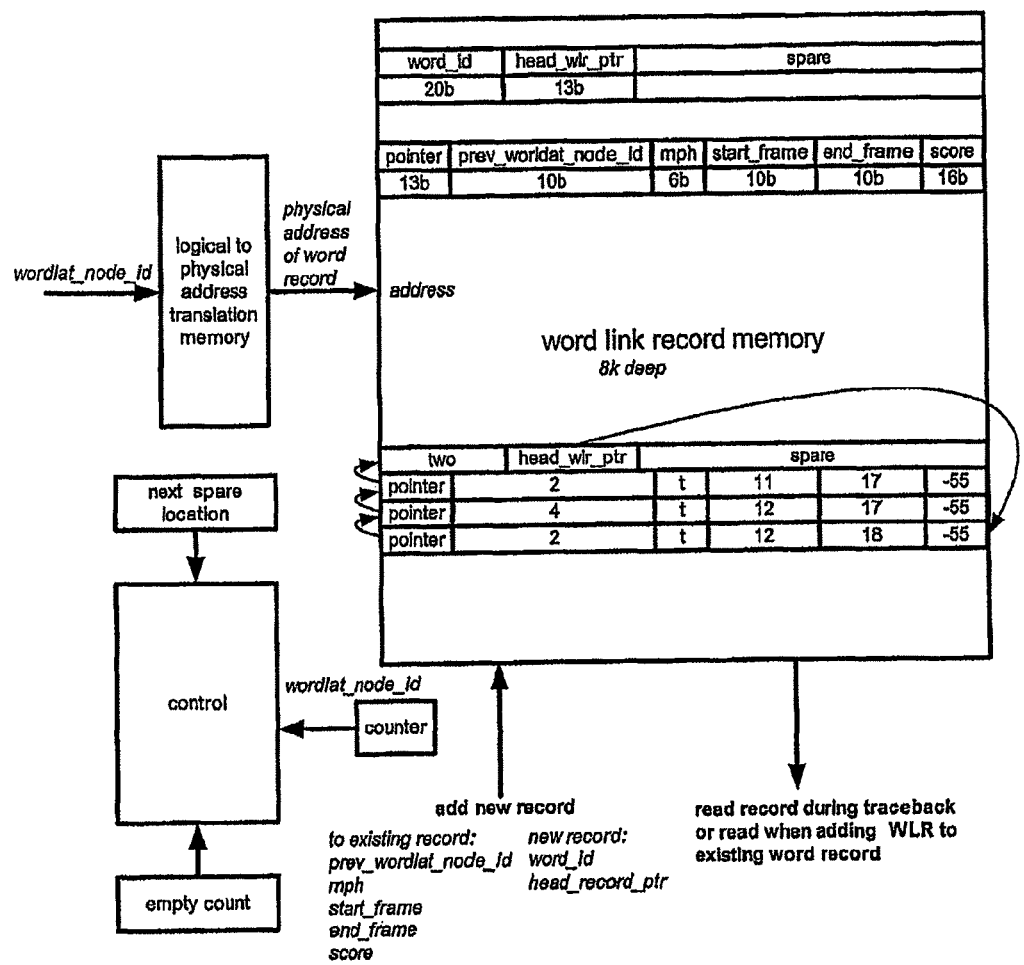
FIG. 10 shows a block diagram of Word Engine.

FIG. 10 shows a block diagram of the word engine. This is designed to allow fast access to the word history (thus allowing rapid phone creation at the phone level), and to allow reasonably fast trace back. The Word Engine is primarily a memory store that fills incrementally. The decoupling of the wordlat_node_id and the physical address will allow the possibility of being able to keep the WLRs for a given word in contiguous addresses, thus avoiding the need for the pointer field.

The language model interface is designed to allow the Phone Book to quickly obtain the appropriate LM factor for the phone model that it is currently constructing. Based on the phones in the wave front, all possible next LM factors can be determined. This will be done in software together with the language model factor engine. The ARM 9 will maintain its own record of the wavefront using the same next phone requests received by the wave front manager and its own copy of the lexical tree.

Figure 11:
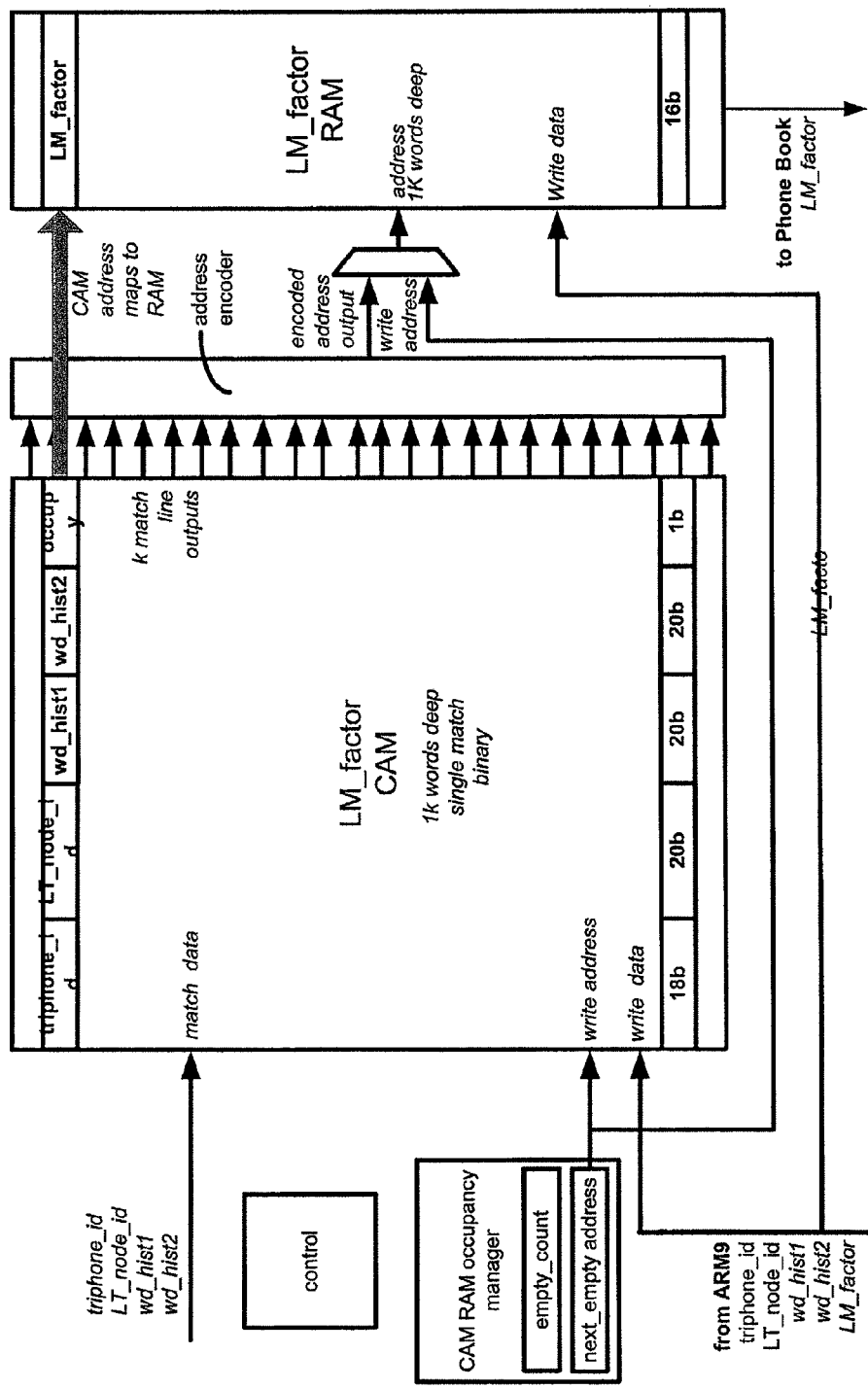
FIG. 11 shows a Language Model interface architecture.

FIG. 11 shows the architecture of the LM interface. This allows the Phone book to quickly access the LM factor for the phone that is currently being generated. Prior to the phone generation phase LM_factors are computed for all possible phones that may be generated in the next frame.

The grammar engine is designed to give the Phone Book a quick response to requests for the next grammar node(s). In the case of a task grammar where the lexicon may be limited to a few words (e.g. yes, no), it may be desirable to use the same lexical tree. In this case it will be necessary for the grammar, to provide lexical tree pointers such that the phone generator can jump to the appropriate part of the lexical tree.

For a speech recognition system it is also necessary to specify the grammar. Again we will use HTK's Standard Lattice Format (SLF) to specify the grammar. In practice it will be convenient to use HTK's HParse format to specify the grammar using a high level grammar notation. This can then be converted into using the HParse tool. Consider having to specify a grammar for a digit recognition task. The HParse format for this is as follows:

$digit=one|two|three|four|five|six|seven|eight|nine|zero
$digit_sp=$digit sp
$noise=lipsmack|breath|sil
([sil]<$digit_sp|$noise>[sil])

where | denotes alternatives, < > denotes one or more repetitions, { } denotes zero or more repetitions, [ ] denotes that item is optional, and ( ) contains the grammar.

Figure 12:
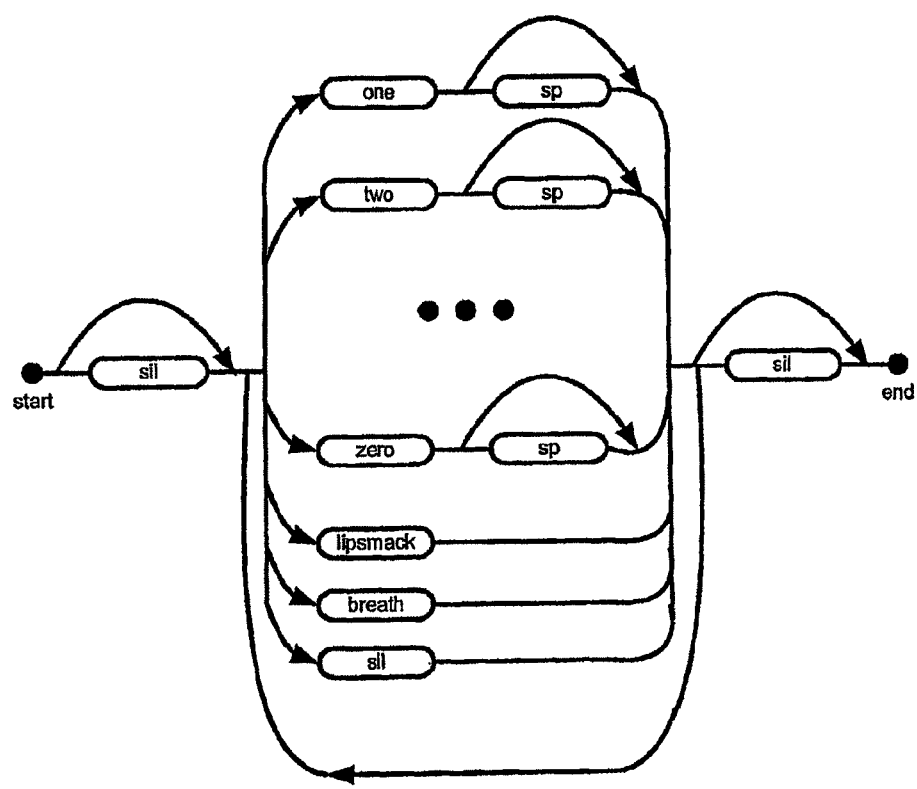
FIG. 12 shows an example of a simple Loop Grammar.

FIG. 12 shows the network that is defined by this grammar. The network starts and ends with a "sil" phone, representing silence. Between the start and end, a number of possible routes correspond to further silence, a breath, a lipsmack sound, or a detected word.

Figure 13:
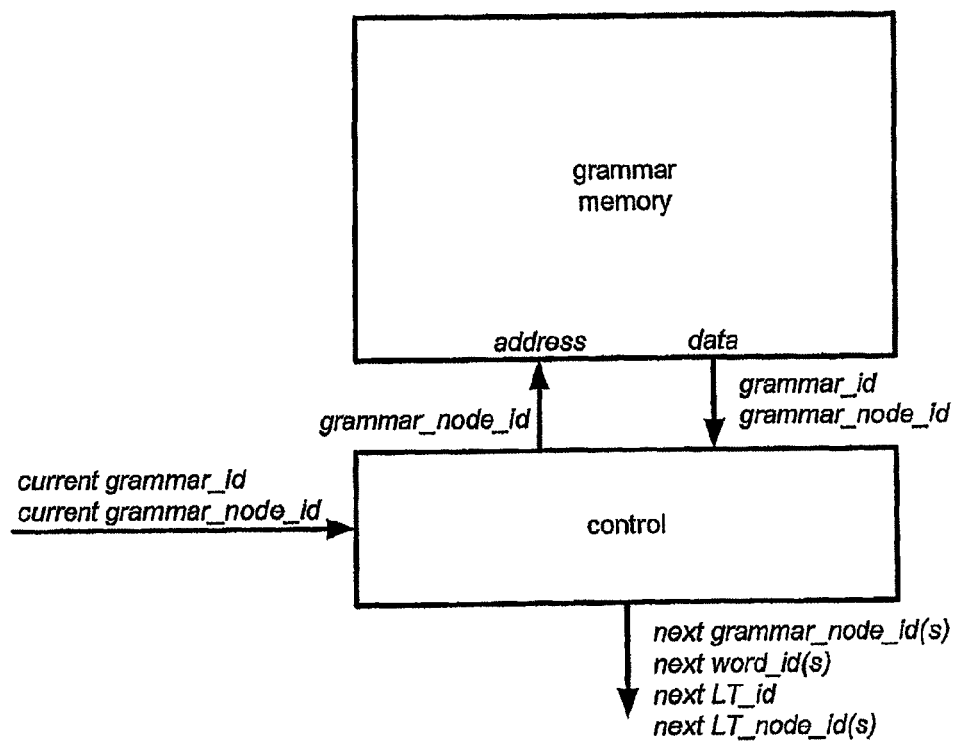
FIG. 13 shows a block diagram of grammar engine.

FIG. 13 shows the grammar engine architecture. When a next phone request arrives, the next grammar node(s) must be retrieved from memory. In the case of a task grammar, the phone book should be given the lexical tree memory addresses to allow the phone to be determined.

Figure 14:
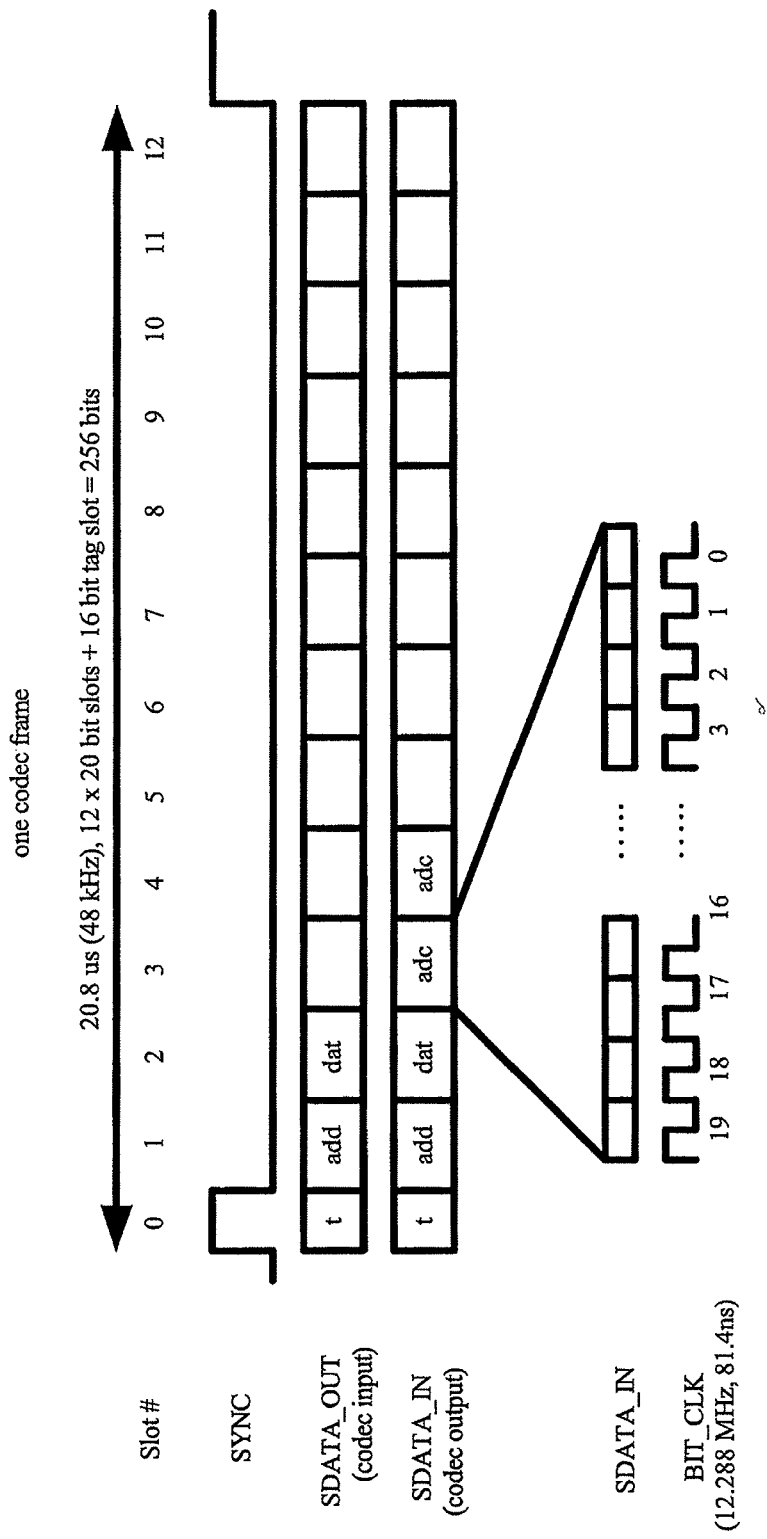
FIG. 14 shows a single frame of the Audio Codec link protocol.

FIG. 14 shows a single frame of the Audio Codec (AC) link protocol used in some embodiments of the invention. The Advanced Audio CODEC Interface (AACI) is an ARM Primecell that provides an interface to off-chip AC97 audio codecs. AC97 is Intel's audio codec specification, initially created for the PC market. The AACI is an AMBA slave block that connects to the Advanced Peripheral bus (APB). The AACI connects to the off-chip codec using the AC-link protocol.

The AC-link protocol is a bi-directional, fixed clock rate, serial digital stream. AC-link handles multiple input and output PCM audio streams as well as register control accesses. It employs a time division multiplexed (TDM) scheme that divides each audio frame into 12 outgoing and 12 incoming data streams each with up to 20 bit sample resolution. The tag slots are used to indicate which of the subsequent slots contain valid data. Add and dat are the control register address and data slots for read and writes. The adc slots contain the outputs from the analog to digital converters. Assuming that the ADC sample rate is set to 16 kHz then the AC-link controller will receive 16 bits of data every third codec frame.

The AACI has 4 channels that can be operated simultaneously. They are accessed through DMA.

Figure 15:
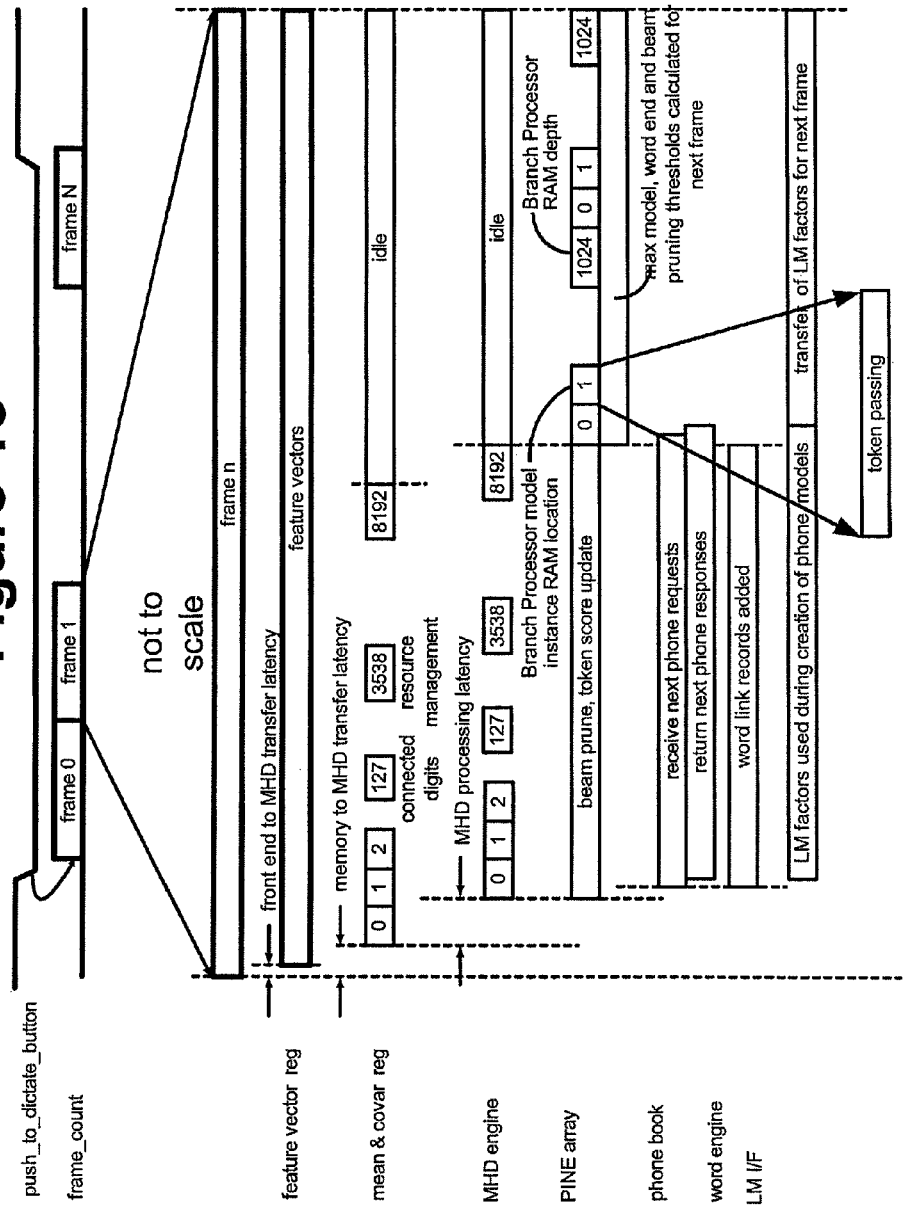
FIG. 15 illustrates the system timing which may be used in the embodiment of FIGS. 1A-1B.

FIG. 15 shows the system timing. Each frame is divided into three sections:

Token update (MHD wash)
First pass—inter phone token passing
Second pass—garbage collection, max model pruning The horizontal direction of the figure indicates elapsing time, and various subcircuits and processes are indicated along the vertical direction of the figure. The top part of the diagram shows frame count, and push to dictate button, and the lower part of the diagram shows various subcircuits and processes, within a single time frame, whilst the push to dictate button is engaged. These subcircuits and processes are language model interface, word engine, phone book, PINE array, MHD engine, mean & covar reg, and feature vector reg.

At the start of the time frame, the feature vector is generated, and the MHD values are calculated. The MHD values are then passed to the PINE array, which engages in beam pruning and token score updating. The phone book receives next phone requests and returns next phone responses. The word engine adds word link records, and the language model interface supplies language model factors.

In the second part of the frame, pruning thresholds are calculated for the PINE array, for the next frame, and the PINE array engages in token passing. The language model interface transfers language model factors for the next frame.

Whilst the "push to dictate" button remains activated, the above process repeats in a sequence of frames.

The embodiments of the invention which are now described relate to a distance engine for calculation of Mahalanobis Distances.

Figure 16:
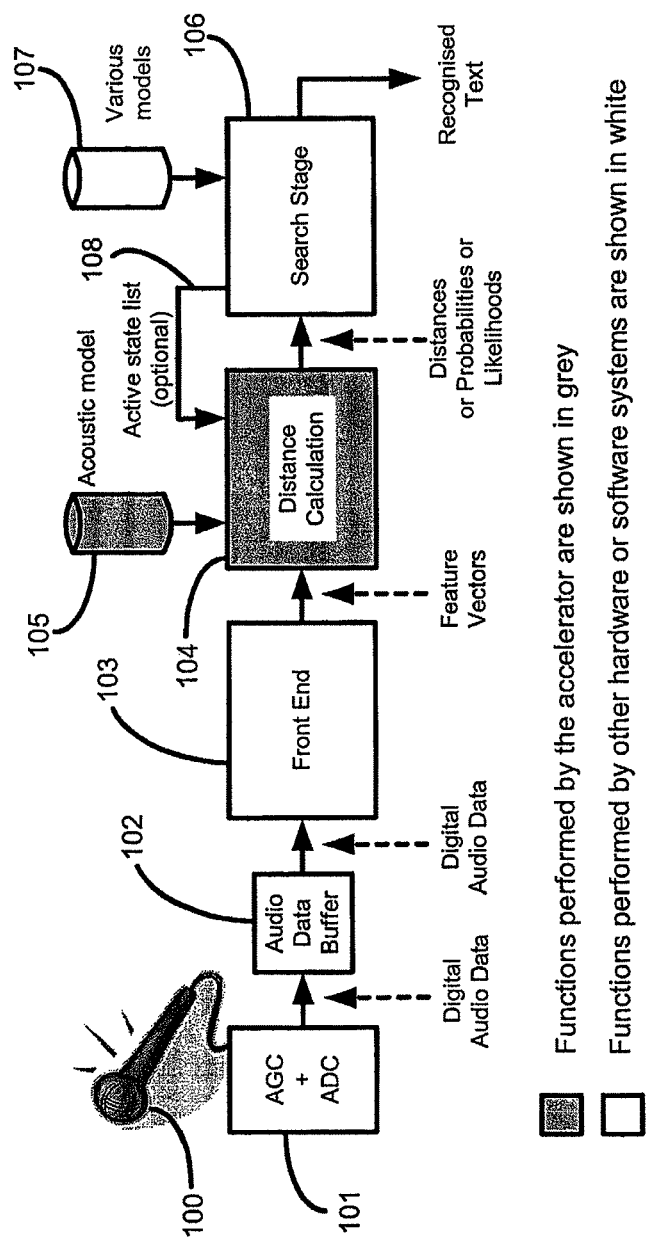
FIG. 16 is a block diagram showing a speech recognition circuit according to an embodiment of the invention, and illustrating data flow between parts of the circuit.

FIG. 16 shows a block diagram of a speech recognition system according to an embodiment of the invention. The system includes a microphone 100, which outputs an audio signal to a combined AGC (automatic gain control) and ADC (analogue to digital converter) 101. In alternative embodiments, the AGC and ADC may be separate. In this embodiment, the incoming data comes from a microphone, and is then converted to digital format. However, it is also possible that the digital audio data may be received from a network, or may be read from storage means such as a memory, an optical disk, or a hard disk drive.

The digital audio data output from the ADC is input to an audio data buffer 102, and may be held here until required. The data is then output from the audio data buffer 102 to a front end circuit 103. The incoming audio data is divided into frames, as described above. In cases where the system is extremely busy, it is possible to drop some audio frames, to allow the system to catch up with any backlog.

In the audio front end circuit 103, the audio is split into spectral components to generate a feature vector, as described above. For example, the feature vector may have a number of frequency bands, and an energy band, plus their first and second derivatives. The feature vector is then output from the front end 103 to the distance calculation engine 104.

The distance calculation engine 104 converts feature vectors into Mahalanobis distances. The acoustic model may be chosen from a plurality of acoustic models, e.g. according to the language used, and may be stored in a storage means 105 such as a memory, a disk drive, etc. The distances calculated by the distance calculation engine are then transferred to the search stage 106 of the speech processing circuit, which uses models such as one or more word models and/or language models to generate and output recognised text. Such word and language models may be stored in a separate storage means 107.

In one embodiment, the distance calculation engine uses Mahalanobis Distance (MHD) calculations to determine distance values for output to the search stage 106. In further embodiments, different types of distance calculations may be used, e.g as described above.

In some embodiments of the invention, the distance calculation engine is designed as a speech accelerator, to operate as a loosely bound co-processor for a CPU running speech recognition software. This has the advantage of reducing computational load on the CPU, and reducing memory bandwidth load for the CPU.

In some embodiments, the accelerator interface is memory-mapped. Other types of interface are also possible to support different system configurations, for example removable accelerator cards with SDIO (secure digital input/output), CardBus, or USB interfaces.

The speech recognition apparatus may also operate with a CPU and DSP (digital signal processor), where the DSP implements the "front-end" signal processing to produce a feature vector, and the CPU implements the search stage, reading the distance results from the distance calculation engine.

The system may be implemented in any combination of hardware or software.

In some embodiments of the invention the search stage 106 provides the distance calculation engine 104 with an active state list 108 that indicates the subset of states for which the search stage requires distances to be calculated by the distance calculation engine 104. This is an optimization that may reduce computation time and/or power consumption.

In preferred embodiments of the invention, the front end 103, distance calculation engine 104 and the search stage 106 operate in a pipelined manner. When operating in a pipelined manner it is unlikely that the search stage 106 will be able to provide the active state list 108 early enough for the distance calculation engine 104 to implement the optimization of computing only the distances that will be required by the search stage 106. The distance calculation circuit 104 may calculate the MHD values for every state in the lexicon, per frame, whether it is subsequently required by the search stage or not. This allows the accelerator and software system to operate in a concurrent pipelined manner, which maximizes the system throughput.

The distance calculation engine 104 may have a plurality of memory areas for storing feature vectors, to allow a feature vector for one frame to be transferred to one memory area in the distance calculation engine 104, while another feature vector for another frame is being read from a second memory area, for calculation of a distance. The memory areas used for reading and writing may alternate with subsequent frames.

Figure 17:
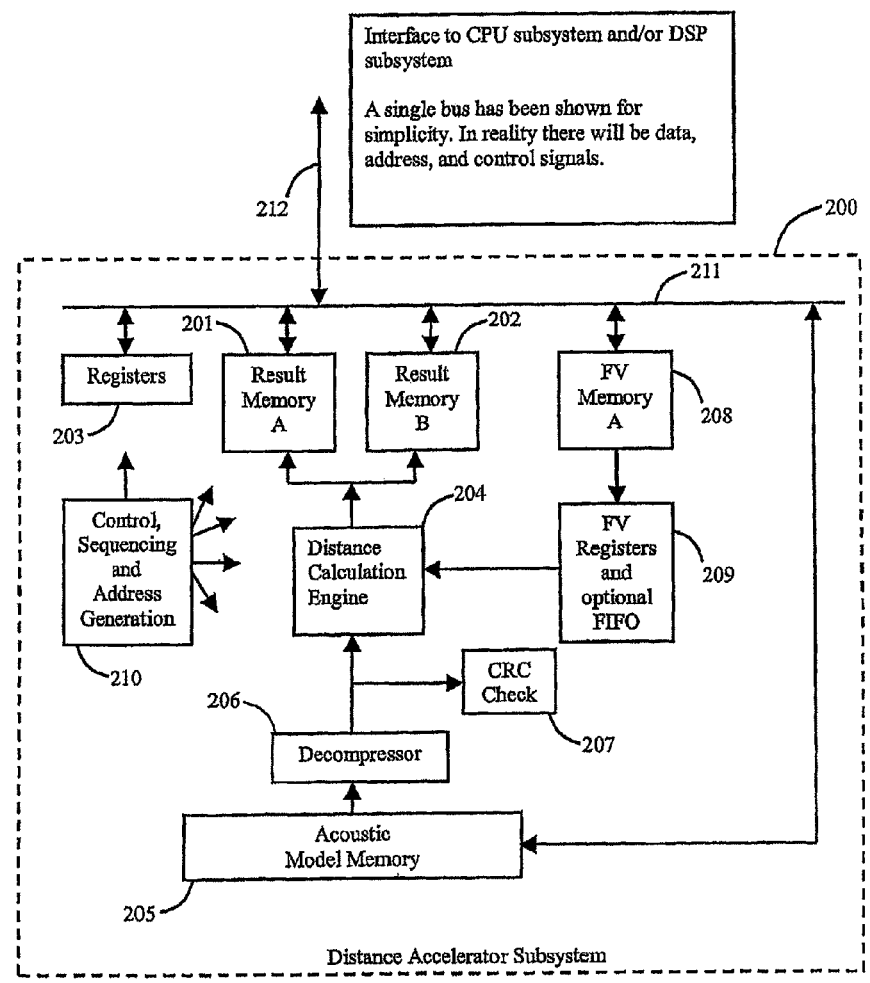
FIG. 17 is a block diagram showing a distance calculation engine according to an embodiment of the invention.

FIG. 17 shows a block diagram of a distance calculation accelerator 200, used in an embodiment of the invention. A feature vector is received at input 212 of the accelerator 200. The feature vector is loaded into feature vector (FV) memory A 208 via a bus 211. In reality, there may be more than a single bus, but for simplicity, only one bus 211 is shown in the figure.

The registers 203 are discussed further at the end of this description. The registers 203 may include, for example, an accelerator status register, for indicating whether the acoustic model data is correctly stored in memory, as described in more detail below. The FV registers 209 hold the feature vector whose distances are currently bring computed by the distance calculation engine 204. If the distance calculation engine 204 is implemented in software, the FV registers might be implemented as memory attached to the processor running the software. If the distance calculation engine 204 is implemented in hardware the FV registers might be implemented as logic or as a memory block. The FV registers 209 are loaded from the FV memory 208 when the Distance Calculation Engine 204 has completed distance calculations for the current feature vector and a subsequent feature vector is available in the FV memory 208. In some embodiments there is an optional FIFO associated with FV registers 209 so that the FIFO is loaded from the FV memory 208 when there is a subsequent feature vector in the FV memory 208 and there is a space in the FIFO. In these embodiments the FV Registers 209 are loaded from the associated optional FIFO 209 when the Distance Calculation Engine 204 has completed calculations for the current feature vector and there is a subsequent feature vector in the associated optional FIFO 209. The presence of the FIFO 209 provides for a looser coupling between the Front End 103 and the accelerator 200 which improves performance in some system configurations.

Each feature vector is transferred to a distance calculation engine circuit 204, to obtain distances for each state of the acoustic model. The acoustic model is stored in an acoustic model memory 205, which is connected to the bus 211, for control of reading/writing to the memory. In some embodiments, this also allows acoustic models to be changed or updated via the bus. The acoustic model may be stored in compressed form in the acoustic model memory 205. A decompressor 206 is provided on the data output of the acoustic model memory. The decompressor 206 can decompress the results as they are needed, and thus allows a much smaller size of acoustic memory to be used, than with uncompressed data. From the decompressor 206, the decompressed acoustic model states are sent to the distance calculation engine 204.

The distance calculation engine 204 converts feature vectors and acoustic model states to distances. The accelerator 200 includes two separate results memories for storing these calculated distances, labelled as "result memory A" 201 and "result memory B" 202.

The control, sequencing, and address generation 210 is logic, state machines, and/or software programs that provide overall control of the other elements of the accelerator, taking inputs from the registers 203, and all the other elements and interfaces to determine when to start and stop the Distance Calculation Engine 204. The control 210 also produces addresses and control signals to control the reading and writing of the memories 201, 202, 205 and 208, to control the flow of data between the various elements of the accelerator 200, the operation of the Decompressor 206, CRC check 207 and Distance Calculation Engine 204, and to control the setting or clearing or status bits in the Registers 203 and to control signalling to the front end 103 and search stage 106. The control 210 is implemented using any of the widely known and used methods of controlling and sequencing in digital systems including logic gates, state machines, and embedded software systems. The control 210 might be a centralized control, or it might be distributed in some or all of the other elements of the accelerator 200, or some combination of these.

Each time a feature vector is loaded into the accelerator, the accelerator computes the distances for all states for that feature vector, and stores the results alternately in the A or B Results Memory. The results are written to one of the two memories 201, 202, while the other memory is available for reading. Thus, while the distance calculation engine 204 is storing the distances calculated for one audio frame, the other result memory may make available the distances calculated for an earlier audio frame, to the search stage of the speech recognition system. For non-real time processing, "earlier" audio frame may refer to an audio frame that has been processed earlier, rather than being limited to an audio frame that corresponds to speech at an earlier time.

Thus, the search stage software reads results alternatively from the A or B result memory, while the accelerator writes results into the other result memory, allowing concurrent pipelined operation of the accelerator and the CPU [and the DSP if present].

In some implementations the A and B results memories may be exposed to the software interface as separate memories appearing at different locations in the CPU and/or DSP memory map. Another implementation is to map each memory alternatively to the same range of addresses in the CPU and/or DSP memory map, so that the software always accesses results at the same location, and the memory containing the set of results the software currently needs to access is the one mapped there.

The accelerator may autonomously load and decompress an acoustic model, which is stored in a compressed format in the acoustic model memory 205. The Acoustic Model may be loaded into the Acoustic Model Memory by software running on the CPU prior to the first use of the Accelerator. The Acoustic Model Memory may be an on-chip memory, to maximize bandwidth and minimize power consumption of reading in the entire Acoustic Model every frame, which means 50 to 100 times per second, depending on the system design.

The Acoustic Model Memory may be a dedicated memory attached to, or incorporated within, the accelerator. Alternatively the Acoustic Model Memory may be a shared resource that is used by other system functions or applications when speech recognition is not running. To allow detection of situations where the acoustic model has been overwritten by another application, a pre-calculated CRC (cyclic redundancy check) signature may be stored with the acoustic model. Each time the acoustic model is read into the accelerator, a CRC may be computed and compared with the signature. If the comparison fails, an error bit is set in the accelerator status register.

Some embodiments of the invention relate to speech recognition systems comprising separate front end 103 and search stage 106 processors. These separate processors perform the front-end and search stages of the recognition process, with the accelerator 200 performing the distance calculations. Typically the front-end processing would be performed on a DSP and search stage would be performed on a CPU, although this description holds for any type of processors, even dedicated hardware implementations. As shown in FIG. 17, the front end 103 supplies the distance accelerator with feature vectors, and the search stage 106 uses distances calculated by the accelerator.

The accelerator is designed to operate in a concurrent pipelined manner with the other processors, allowing a high level of parallelism in the system.

Figure 18:
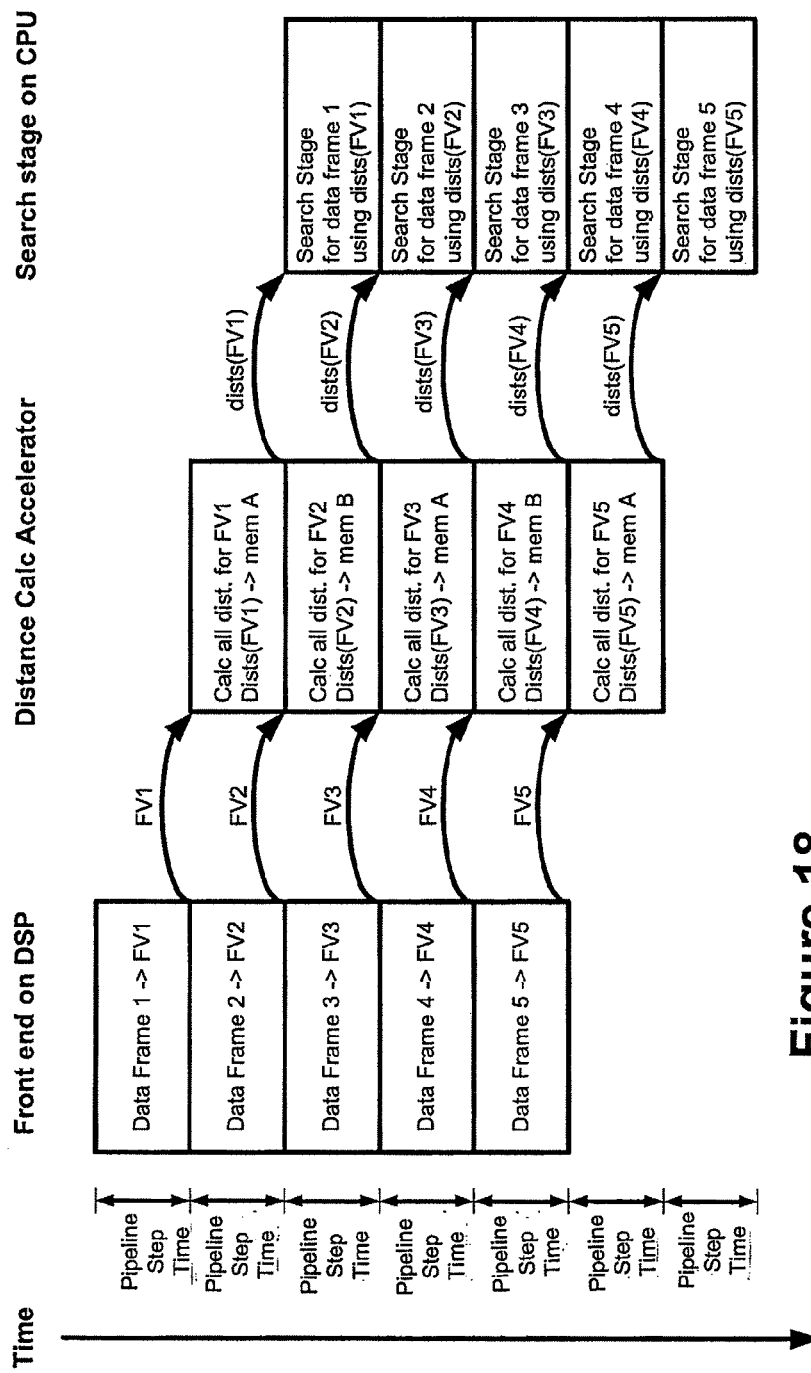
FIG. 18 shows ideal data flow over several time steps within a speech recognition circuit having separate front end and search stages, in an embodiment of the invention.

FIG. 18 shows how this pipelined operation works in an embodiment of the invention with ideal data flow, i.e. where each of the three recognition stages require exactly the same time to process each data frame, and the processors are never delayed, stalled, or diverted to other tasks.

The time axis is divided into equal "pipeline step times". If the step time is the same as a frame time then the system is processing audio in real time. If the step time is short than a frame time, the system is operating faster than real time, which may be valuable for batch processing of audio data, or catching up after some type of delay. If the step time is loner than a frame time, the system is operating slower than real time, which may be acceptable in some applications, for example where the person dictating pauses occasionally allowing the system to "catch up".

Once the pipeline has filled (which takes two step times), the DSP, the Accelerator, and the CPU are all operating in parallel. In this idealized example, the total time available for processing a frame is three step times—one step time in the DSP, one step time in the accelerator, and one step time in the search stage. There is a latency of three step times from the time the audio data enters the front end to the completion of the search stage for that frame, and the processing of one frame finishes each step time. If the system were not pipelined, then the processing of all stages for one frame would have to complete in one step time in order to achieve the same overall throughput of frames per second. Thus pipelining in this way can achieve three times the throughput with the same processing elements, compared to a non-pipelined system. A non-pipelined system would be one in which the processing of frame n+1 would not start until all stages of the processing of frame n was already complete.

If, for example, in a system running in real time with a frame time and step time of $\frac{1}{100}^{th}$ of a second, which is 10 ms, each of the three processing elements has the entire 10 ms available to complete the processing of one stage of the recognition task, giving 30 ms of processing time overall for each frame. If the system were not pipelined, real time operation would require that all three processing elements would be complete in 10 ms, allowing only 3.3 ms for each of the three processing elements.

At the end of each pipeline step time, the DSP provides a feature vector to the Accelerator, and the accelerator provides a set of distance results to the CPU. When the CPU is performing the search stage for frame n, the Accelerator is computing the distances for frame n+1, and the DSP is performing the front-end stage for frame n+2. During each pipeline step, the front end processing consumes one frame of digital audio data (although this is not indicated explicitly on the diagram).

Real world systems are more complex that the idealized system in many ways. The processing time for a frame is often highly variable and data dependent, especially in the search stage, and the processing time for each processing stage is likely to be quite different. The DSP and CPU are likely from time to time to be diverted to run other software tasks, either to service interrupts, or under control of an operating system scheduling regime. Communications between the processing elements may be stalled due to competing bus traffic, for example for DMA transfers.

Recognition software may implement "frame dropping" and other advanced techniques, and as a result not all frames are processed through all of the recognition stages. Processing elements cannot respond instantly to the availability of data from the preceding processing stage, resulting in delays.

Finite buffer space for information storage between stages means that an earlier stage may be stalled waiting for a space to store its output data when following processing stages are "falling behind".

Figure 19:
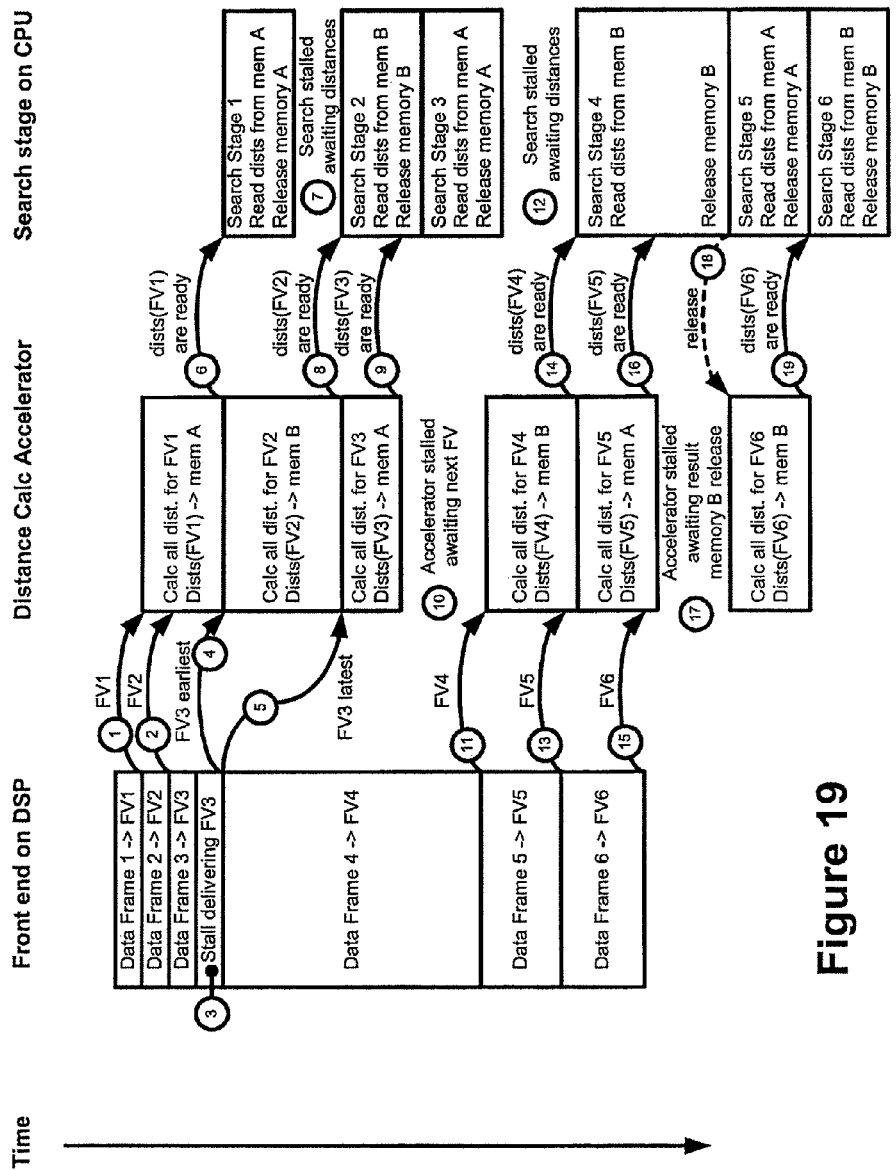
FIG. 19 shows an example of actual data flow over several time steps within a speech recognition circuit having separate front end and search stages, in a further embodiment of the invention.

The accelerator has been carefully designed to mitigate these problems. FIG. 19 shows a pipelined system with real world complications added. The following text describes the interactions shown in the diagram. The time for the processing of various stages has been varied to show difference examples of buffering of data between stages and stalling of processing elements. The numbering corresponds to the numbered bubbles on the diagram. The text also makes reference to memories used to pass information into and out of the accelerator, which are shown in FIG. 17.

The front end has computed the feature vector for the first frame, FV1. It is loaded into the accelerator, causing the accelerator to commence computation of the distances for the frame.

The feature vector for the second frame, FV2, is passed to the accelerator. The accelerator is still busy computing the distances for the first frame, so this feature vector is held in the accelerators FV memory.

The front end has computed the feature vector for the third frame, FV3, but it cannot be delivered to the accelerator as the FV memory is still full, holding FV2. The time period labelled "stall delivering FV3" is the period between FV3 being computed and when it can first be delivered. Of course the DSP could be diverted to some other useful task, or it could buffer FV3 in its own memory and commence computation of FV4.

The arrow labelled "FV3 earliest" shows the earliest time that the feature vector FV3 can be delivered to the accelerator, which is immediately after the accelerator loads FV2 into its internal registers and frees the memory.

The arrow labelled "FV3 latest" shows the latest time that the feature vector FV3 can be delivered to the accelerator without causing the accelerator to stall for lack of a feature vector to work on. This example shows that there is a wide tolerance in the system to when FV3 can be delivered without affecting system performance—an entire accelerator frame processing time. The accelerator provides an interrupt and a status bit that can be polled to indicate the state of the FV memory. Regardless of which control method the DSP uses, the system tolerates long latency without reducing performance. The accelerator signals to the search stage that the distances for frame 1 are available in result memory A. The search stage commences processing for frame 1, reading distances from result memory A.

The search stage has finished its processing for frame 1 before the accelerator has completed computing the distances for frame 2, so the search stage stalls waiting for the accelerator. Of course the CPU could be diverted to other useful tasks, including any search stage tasks that can be completed before distances are available. Again, an interrupt and status bits are provided by the accelerator to control this interaction between the accelerator and the CPU.

The accelerator completes the distance calculation for frame 2, and signals to the CPU that it can commence reading the distances from result memory B.

The accelerator has completed the computation of distances for frame 3 before the search stage has finished processing frame 2. As soon as the search stage signals to the accelerator that it has completed frame 2 by releasing memory B, the accelerator signals that the distances for frame 3 are available, allowing the search stage to immediately move on to processing stage 3.

The accelerator is stalled waiting for feature vector FV4, due to the long processing time in the front end. In real systems this may be caused by a number of factors, including the DSP being diverted to another task for a period of time, or simply due to the DSP performance being insufficient to keep up with the accelerator's throughput.

The accelerator restarts as soon as FV4 is delivered by the front end.

The search stage is stalled waiting for distances for frame 4, a follow on consequence of the late delivery of FV4 to the accelerator.

FV5 is delivered to the accelerator while it is still computing the distances for the previous frame, allowing it to move onto processing frame 5 without stalling when it completes frame 4.

The accelerator signals that the distances for frame 4 are available and the search stage commences processing frame 4.

FV6 is delivered to the accelerator while it is still computing the distances for frame 5.

The availability of distances for frame 5 is signalled by the accelerator to the CPU.

Even though the accelerator has already received FV6, it is stalled waiting for a free result memory it can write the distances into.

The search stage releases result memory B at the end of its processing of frame 4. This allows the accelerator to start computing distances for frame 6.

The accelerator completes computing distances for frame 6 and signals to the CPU that the results are ready.

Further embodiments of the invention relate to systems with a Front End and Search Stage on a single processor. This single processor performs the front-end and search stages of the recognition process, with the accelerator performing the distance calculations. This configuration is likely to be the most common configuration where the accelerator is added to an embedded system such as a PDA or mobile phone that has a high-performance embedded application processor (but no DSP) available to run speech recognition software.

In this configuration the accelerator still operates in a concurrent pipelined manner with the front-end and search stages; it is just that the front-end and search stages are running on a single processor.

CPUs in embedded systems are generally relatively simple compared to desktop PCs and servers. Embedded CPUs in mobile phones, PDAs, in-car navigation and telematics systems, and other consumer electronics devices are typically "simple uni-processors" by which we mean not multi-processors and not supporting hardware multi-threading support—i.e. they can only execute a single thread of instructions (although they can be diverted to a different thread under the control of interrupts, exceptions, or an operating system). For this discussion, except where explicitly stated otherwise, we are talking about embedded processors that are "simple uni-processors". We are also using the term "CPU" and "processor" interchangeably.

Figure 20:
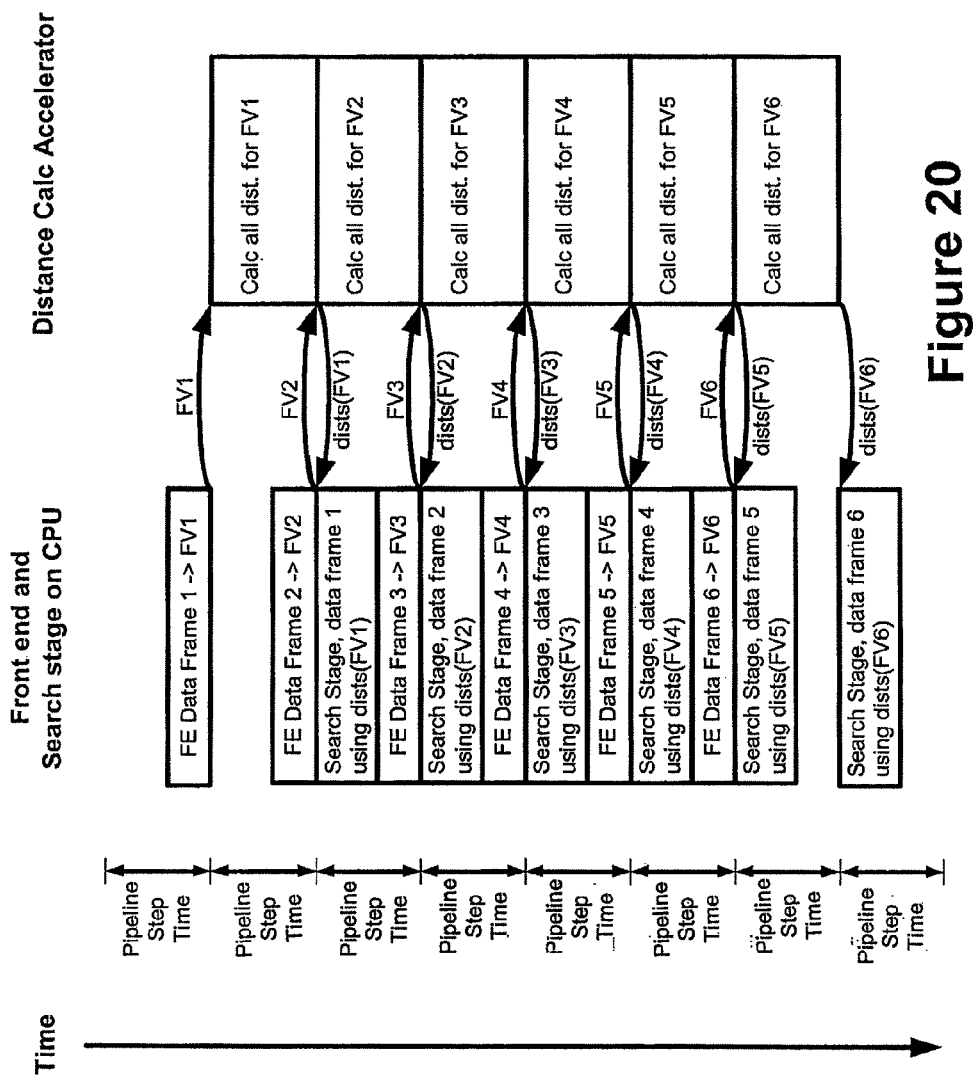
FIG. 20 shows ideal data flow over several time steps within a speech recognition circuit having a shared processor for front end and search stages, in an embodiment of the invention.

FIG. 20 shows how the system can be pipelined with a single embedded processor working with the accelerator, in an idealized system. In this idealized system, the time taken for the processor to perform the front-end and search stage processing is identical to the time the accelerator takes to perform the distance calculations, and the processor is never delayed, stalled, or diverted to other tasks.

The time axis is divided into equal "pipeline step" times. If the step time is the same as a frame time then the system is processing audio in real time. If the step time is short than a frame time, the system is operating faster than real time, which may be valuable for batch processing of audio data, or catching up after some type of delay. If the step time is loner than a frame time, the system is operating slower than real time, which may be acceptable in some applications, for example where the person dictating pauses occasionally allowing the system to "catch up".

The first two pipeline step times are used to fill the pipeline. By the third pipeline step time, the pipeline is full, and all three stages of the recognition process are processed every pipeline step time, with each stage working on the processing of a different data frame.

During the first pipeline step time, the CPU completes the front-end processing for frame 1, and the feature vector passed to the accelerator so that distance calculations can start in the accelerator.

During the second pipeline step time, the front-end processing for frame 2 is completed by the CPU, in parallel with the accelerator computing the distances for frame 1.

During the third pipeline step time, the CPU runs the search stage for frame 1 reading distance results from the accelerator, and then runs the front-end processing for frame 3. The accelerator runs in parallel computing the distances for frame 2 using the feature vectors computed in the previous pipeline step.

Each subsequent pipeline step time is similar to the third pipeline step, with the frame numbers incremented. So for pipeline step n=4, 5, 6, etc. the CPU runs the search stage for frame n−2 and then runs the front-end for frame n. In parallel the accelerator computes the distances for frame n−1.

Note that with this situation the production of feature vectors and the consumptions of results run in lock step—one feature vector is produced every time the search stage consumes one frame of distance results. This considerably reduces the need for elastic buffering between the distance accelerator and the software system.

Again, real world systems are more complex than the idealized system in many ways. For example, the processing time for a frame is often highly variable and data dependent, especially in the search stage, and the processing time for each processing stage is likely to be quite different. The CPU is likely from time to time to be diverted to run other software tasks, either to service interrupts, or under control of an operating system scheduling regime. Communications between the CPU and accelerator may be stalled due to competing bus traffic, for example for DMA transfers.

Recognition software may implement "frame dropping" and other advanced techniques, and as a result not all frames are processed through all of the recognition stages. Processing elements cannot respond instantly to the availability of data from the preceding processing stage, resulting in delays Finite buffer space for information storage between stages means that an earlier stage may be stalled waiting for a space to store its output data when following processing stages are "falling behind".

Figure 21:
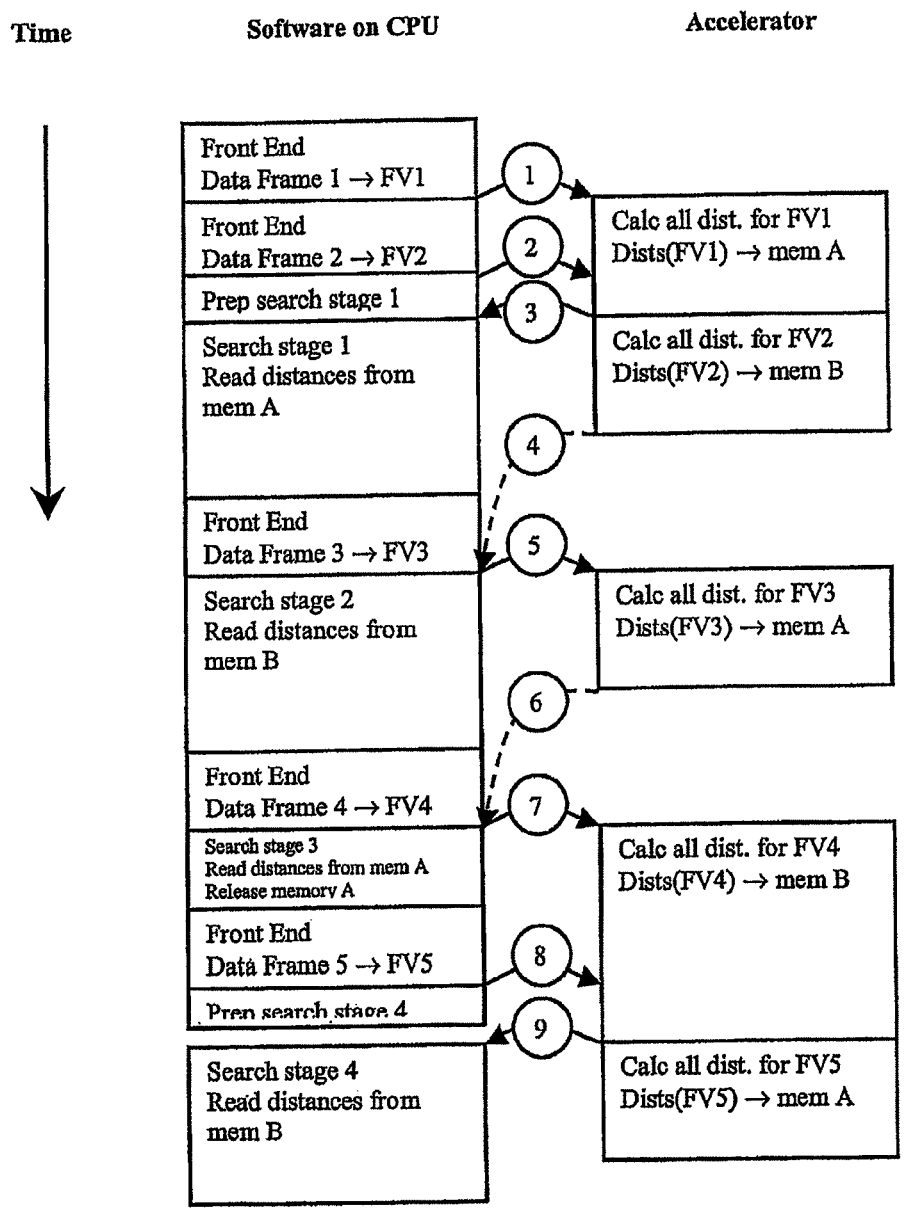
FIG. 21 shows an example of actual data flow over several time steps within a speech recognition circuit having a shared processor for front end and search stages, in an embodiment of the invention.

The accelerator has been carefully designed to mitigate these problems. FIG. 21 shows a pipelined system with real world complications added. The following text describes the interactions shown in the diagram. The time for the processing of various stages has been varied to show difference examples of buffering of data between stages and stalling of processing elements. The numbering corresponds to the numbered bubbles on the diagram. The text also makes reference to memories used to pass information into and out of the accelerator, which are shown in FIG. 21.

At the end of front-end processing for frame 1, the CPU passes the feature vectors for frame 1 to the accelerator, allowing distance calculations to start.

To fill the pipeline, the CPU immediately performs the front-end processing for frame 2 and passes the feature vectors to the accelerator. They are stored in the accelerator so that the accelerator can load them into its internal engine for processing as soon as the distance calculations for frame 1 are complete.

The CPU is now ready to start the search stage for frame 1, however the distance computation in the accelerator has not completed. The box labeled "Prep search stage 1" indicates a period where the CPU could do any preparatory search stage processing that does not require distances. Alternatively the CPU could be diverted to another task, or it can stall waiting for the distance results.

The accelerator signals that the distance results for frame 1 are now available. The search stage can commence on the CPU, reading distance results from the accelerator's Result Memory A. The accelerator automatically starts processing the feature vector for frame 2 that was delivered earlier.

The accelerator signals to the CPU that it has completed the distance calculations for frame 2. The CPU is still busy running the search stage for frame 1, and has still to run the front end for frame 3, so the completion signal is ignored until the CPU has need of it, when it starts running the search stage for frame 2. As the accelerator has not received the feature vector for frame 3, it has no task it can perform and so it stalls.

The CPU delivers the feature vector for frame 3, restarting the accelerator, which writes results into Result Memory A. Note that Result Memory A was previously "released" at the end of the processing of search stage 1, informing the accelerator that it can overwrite the old results held in that memory with new results. The CPU then runs the search stage for frame 2, reading distance results from the accelerator's Result Memory B.

The accelerator signals to the CPU that the distance results for frame 3 are complete in Result Memory A. Again, the CPU ignores this signal until it is ready to commence the search stage for frame 3, and the accelerator stalls waiting for the next feature vector.

The CPU delivers the feature vector for frame 4, restarting the accelerator. It them starts search stage 3 reading distances from the accelerator's result memory A.

Search stage 3 and front end 5 were completed quickly, so that the feature vector for frame 5 is delivered to the accelerator while it is still running. The CPU performs all the preparatory work it can for the search stage, and then stalls waiting for distances to be available.

The accelerator signals that the distances for frame 4 are available. The CPU starts search stage 4, reading the distances from the accelerator's result memory B. The accelerator automatically starts computing distances for frame 5 using the feature vector delivered earlier.

Note that with the pipelining scheme just presented which alternates front-end and search stage processing, the accelerator can never stall waiting for a result memory to be released because the feature vector the accelerator needs as an input is not produced until after the memory has been cleared. The CPU task schedule could be described with the shorthand F1 F2 S1 F3 S2 F4 S3 F5 S4.

It can seen readily from FIG. 21 and the accompanying description above, that with this CPU task schedule, that the operation of the CPU and accelerator are tightly coupled and whenever the processing time for a pipeline step on the CPU is unequal to the processing time on the accelerator, then it quickly results in one of them stalling.

In a system where either the CPU or the accelerator is always (or at least in most instances) slower than the other in completing its processing task, stalling is inevitable and throughput may not be improved by adding additional buffering (e.g. additional result memories or FIFO depth on the feature vector interface). [Unless there are other difficulties to mitigate such as very low-bandwidth buses linking the CPU to the accelerator, or competing bus traffic such as DMA transfers that can significantly reduce performance.

If the processing time for a pipeline step is highly variable on either the CPU or Accelerator, such that there are regular changes in which one of them takes the longer time, then significant enhancements in throughput may be obtained by adding additional buffering between them. This may have the disadvantage of adding additional latency through the system. This buffering may be implemented by adding additional depth to the Feature Vector FIFO, and/or adding additional Result Memories. Alternatively it may be by implementing elastic buffers in software.

If the accelerator has sufficient buffering on the feature vector interface, e.g. by including the optional FIFO shown in FIG. 21, then increasing the pipeline depth by computing extra front end frames up front will improve throughput at a cost of extra latency. This will result in a CPU task schedule of F1 F2 F3 S1 F4 S2 F5 S3 F6 S4 or F1 F2 F3 F4 S1 F5 S2 F6 S3 F7 S4, etc.

Of course it would also be possible to dynamically schedule whether the CPU should run the front-end or search stage code based on the availability, or not, of distance results and/or the space available to store more feature vectors and distance results. Given the fundamental relationship that one set of distance results is produced by the accelerator for every feature vector it consumes, and the restriction stated at the start of this section that we are discussing single-threaded CPUs, dynamic scheduling is likely to add little performance improvement while being complex to implement.

On a CPU supporting multi-threaded operation (which is a technique for improving performance in the presence of high memory system latency), or on a multi-processor, the highest system performance is likely to be achieved by running the front-end and search stages concurrently as separate threads, rather than alternating between the front-end and search stages. The system operation is then very similar to that described above, if each thread is thought of as a separate virtual processor. In some embodiments of the invention, elastic buffers may be used between stages, to accommodate varying time delays between the processing of frames at each stage. Elastic buffers in the interfaces between the three recognition stages may also significantly enhance performance of such a system.

Operation of the accelerator and the software system is not constrained to a rigid repetitive frame time. Instead the timing of the system is controlled dynamically by the availability of feature vectors into the accelerator, and the consumption of results out of the accelerator.

This allows the recognition process to fall behind real-time operation and to "catch up" again. It also allows the system to be robust in complex systems where interrupts, DMA bus traffic, memory caches, operating system task switching, and competing real-time software tasks all make guaranteeing rigid timing constraints impractical.

Elastic buffers at the major data transfer points between processing elements maximize system performance by allowing one element to continue useful processing whenever it can, regardless of whether other processing elements have been stalled or diverted to other tasks. Elastic buffers are useful for the following applications:

(1) For buffering raw audio data arriving in real time from the microphone(s) The data would typically be moved into the buffer by a DMA and/or high priority interrupt driven software process to ensure that hard real time constraints are met.

(2) For buffering feature vectors output from the front end. This is especially true if the front-end is implemented on a DSP or other processing element independent of the search stage.

(3) For buffering distance results from the accelerator. Again this is especially true if the front-end and search stages are implemented on independent processing elements. This buffering is also especially valuable if the interface between the search stage processor and the accelerator is very slow, has high latency, or is subject to competing bus traffic.

The Feature Vector and Results interfaces on the accelerator already provide a level of elasticity that should be sufficient in systems where the Front End and Search stages are running on the same CPU, and the accelerator has a high-bandwidth interface to the CPU with low level of competition from other bus traffic such as DMA.

Other embodiments may have deeper FIFOs. In one embodiment, the two result memories are an implementation of a FIFO where the implementation is exposed across the interface. It would be possible to have additional memories and use them in a round-robin fashion, or to use another implementation of a FIFO that hides the FIFO depth by only exposing one result memory at a time to the interface. An example of this would be to map each memory in turn to a memory range that is always used to read results, so that at any one time the "current" result memory is mapped to that location. This would hide the FIFO depth behind the interface so that the pipeline depth can be changed without changing the software (or hardware) that accesses the interface.

Slow or Conflicted Bus Interfaces may occur. In the system configurations described above, the search stage reads distances directly from the Accelerator's Result Memories. The result memories allow the search stage to randomly access the distance results, as they are needed. This will only give a high performance system if the interface or bus between the CPU and Accelerator provides the CPU with low latency, high bandwidth access to the Accelerator Result Memories.

In some systems it is not practical to provide such a low latency, high bandwidth interface between the CPU and the Accelerator. This may be for many reasons, including:

The interface is a bus shared with other devices and/or processors that generate bus traffic that keeps the bus busy such that the CPU access to the accelerator is delayed waiting for the bus to be free. DMA transfers are one example of conflicting bus traffic.

The interface is implemented as a serial bus, or narrow parallel bus, for cost or compatibility reasons, yielding low bandwidth and high latency The interface crosses an industry standard interface such as PCI, USB, SDIO, Cardbus, Firewire, PCIExpress etc. that introduces protocol overheads and/or latency as would be the case where the accelerator is in a plug-in peripheral to a system containing a CPU (or CPU and DSP).

In these situations it is possible to add another pipeline stage during which the result data is copied from the Accelerator into another memory (which we will call a "buffer memory") to which the CPU does have high bandwidth, low latency access. This copying can be performed by a DMA controller, or by software running as an interrupt handler, or a separate software thread on the CPU, or a software thread on another processor, or by other commonly known means. The device controlling the transfer may be on the CPU side of the interface or on the accelerator side of the interface, depending on the capabilities of the interface. This extra pipeline stage then allows an entire pipeline step time to copy the data from the accelerator to the other memory. The data copy can optionally be performed as a sequential burst, or a number of sequential bursts, to optimize transfers across the interface between the Accelerator and the buffer memory. The search stage, running on the CPU, can then randomly access the results in the buffer memory with low latency.

Similarly an extra pipeline stage can be added for transferring the Feature Vectors to the Accelerator, although given that the feature vectors are a much smaller object than the distance results, and that they are not accessed randomly across the interface but delivered once to the Accelerator for each frame, there are fewer situations where the performance benefit from this extra pipeline stage is as significant.

Figure 22:
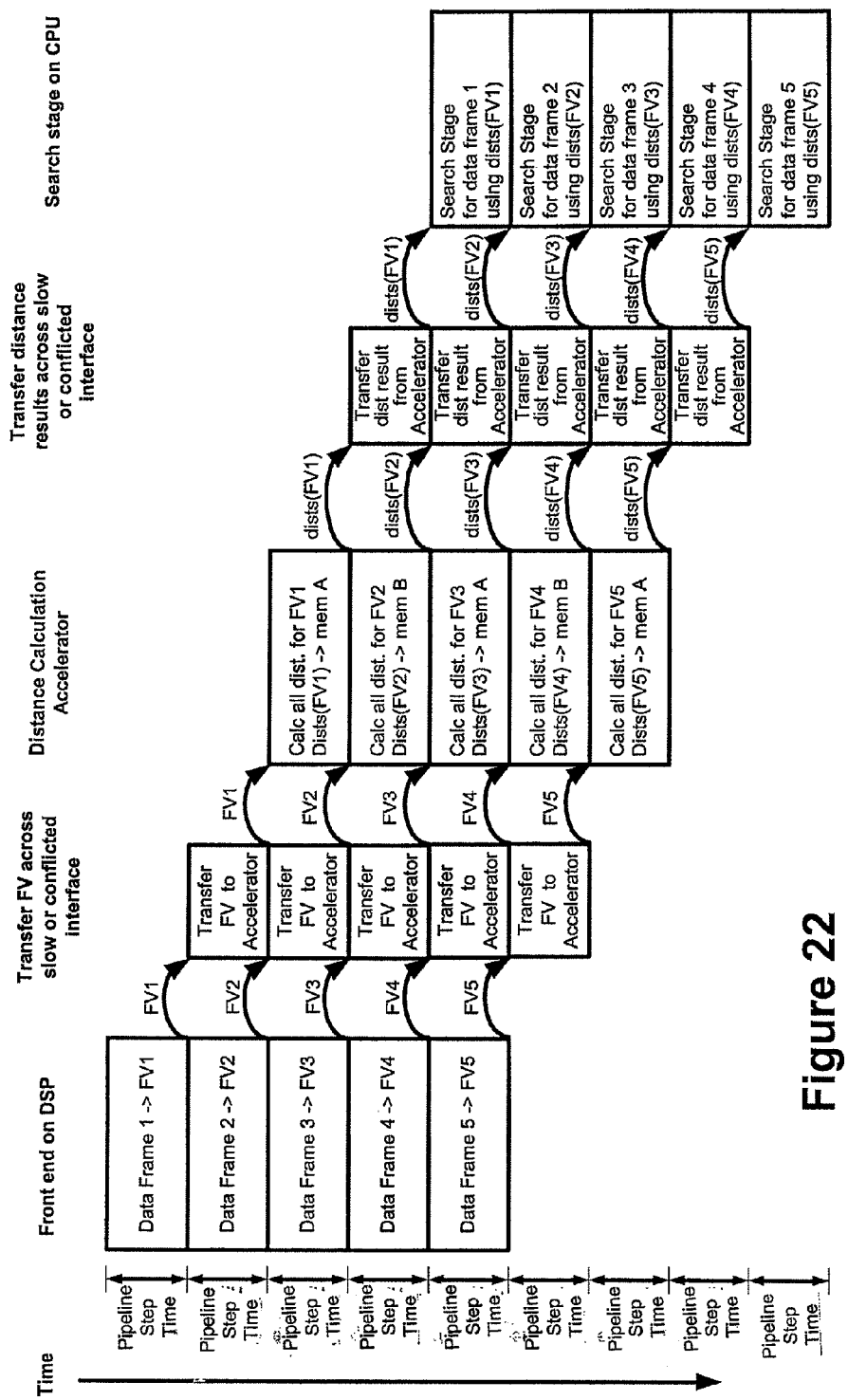
FIG. 22 shows ideal data flow in a speech accelerator pipeline with two data transfer stages, according to an embodiment of the invention.

FIGS. 22 and 23 show idealized systems with the two extra pipeline stages for transfers added. The first shows a system with a CPU, DSP, and Accelerator with the two extra pipeline stages. The second shows a system with a CPU and DSP with the two pipeline stages added.

Other embodiments may add additional pipeline stages so that the distance computations are performed over two or more pipeline stages rather than being restricted to a single pipeline stage. This allows more time for the computation of the distance results for each frame, while maintaining the same throughput of distance results. This is similar in concept to the well-known pipelining techniques used to implement RISC microprocessors.

The Acoustic Models may occupy many megabytes of storage space. In embedded systems they will typically held in a non-volatile memory such as FLASH memory, or other types of non-volatile memory as is the appropriate currently economic technology. The Accelerator may read the acoustic model directly from the non-volatile memory, or more likely the acoustic model will be copied from the non-volatile memory into a higher bandwidth RAM memory of some type (e.g. SRAM or DRAM, SDRAM, etc.). The RAM memory may be part of the same integrated circuit as the Accelerator (i.e. "on chip"), or attached to the integrated circuit containing the Accelerator. ("off chip"). The having the RAM memory on-chip is particularly advantageous, as this configuration would give the lowest power consumption and highest bandwidth. An alternative solution would be for the acoustic model to be stored on a disk drive, or an another device accessible via a wired or wireless bus or network, and for the acoustic model to be loaded into the RAM memory from the disk drive, or over the wired or wireless bus or network.

On-chip RAM memory is however likely to come at a cost-premium to off-chip commodity memory devices. Many embedded systems face extreme cost pressures in the market place, especially high volume devices supplied by many manufacturers such as mobile phones. For a speech recognizer to be incorporated into such systems, the overall recognizer solution much be delivered at very low cost. There is therefore a significant economic benefit from reducing the cost of the RAM memory and the non-volatile memory. One way to reduce the cost of these memories is to compress the acoustic models and store the compressed model in the memory.

The Accelerator computes all of the distances associated with each Feature Vector that is delivered to it by the front end. This means that the accelerator must use the data from the entire Acoustic Model each time a new Feature Vector is presented to the Accelerator (with the exception of some specific optimizations that may determine that some data values need not be used in the distance computations). It is therefore possible to arrange for the accelerator to read through the acoustic data sequentially once for each Feature Vector, using each data value as it read from the Acoustic Model.

Reading through the entire Acoustic Model sequentially is ideally suited to placing a decompressor between the distance calculation engine and the RAM memory, because many compression schemes depend on the decompressor reading sequentially through the compressed data, and do not readily support random access into the compressed data.

Thus this configuration allows storing compressed data in the RAM memory (and the non-volatile memory), which can therefore be smaller and lower cost. There is no requirement for a memory that is large enough to hold the entire decompressed acoustic model, as the decompressed data is consumed as it is decompressed.

The decompression scheme could be any combination of:
sign or zero extension or otherwise conversion of narrow or variable width data to a wider data format.
sign or zero extension or otherwise conversion of narrow or variable width data to IEEE standard single or double precision floating point format
codebook decompression of a binary bitstream, where the codebook is stored as part of the acoustic model data
decompression of a Huffman or Lempel-Ziv compressed stream
decompression of run length encoded data
decompression of difference encoded data
any well known compression scheme.

Additionally the model size can be reduced by using subspace distribution clustering and the decompressor and distance calculation engine designed to operate with such models.

The following description provides further information on the visible registers in some embodiments of the invention.

The register bank is designed to allow simple connection with an 8-bit data bus. Accesses to the register bank should be made with byte-read and byte-write accesses. To facilitate this, only the least significant 8 bits of the data bus are used.

The address decoder should respond to byte accesses to byte 0 or byte 3 within the designated word. This way the same code can be used on an ARM processor regardless of whether the processor is configured for little endian or big endian operation.

REGBASE=Base address of register bank
Register 0 Product Version
8-bit Product version ID
This register value is changed when the functionality of the hardware charges in a way that changes the hardware/software interface.
Address=REGBASE (and REGBASE+3 for big endian)
Read only. Reads with value 0x01
Writes ignored
Register 1 Implementation Version
8-bit Implementation version ID
This register value is changed for each implementation to facilitate bug tracking and version control.
Address=REGBASE+4 (and REGBASE+4+3 for big endian)
Read only. Reads with value 0x01
Writes ignored
Register 2 Interrupt Enable
8-bit Interrupt Enable register
Address=REGBASE+4*2 (and REGBASE+4*2+3 for big endian)
Readable and writeable.
Value following reset is 0 for bits 0, 1, 2, 3
Bit 0 I 1=Enable FV memory empty interrupt on Int0 output.
Bit 1 J 1=Enable Results complete interrupt on Int0 output.
Bit 2 K 1=Enable FV memory empty interrupt on Int1 output.
Bit 3 L 1=Enable Results complete interrupt on Int1 output.
Bit 4 Future use. Read value is not defined. Writes ignored.
Bit 5 Future use. Read value is not defined. Writes ignored.
Bit 6 Future use. Read value is not defined. Writes ignored.
Bit 7 Future use. Read value is not defined. Writes ignored.
Software should use a read-modify-write code sequence when setting this register so that future use bits are written with the value read from them.
Register 3 Status
Address=REGBASE+4*3 (and REGBASE+4*3+3 for big endian)
Read-only register. Writes are ignored.
Value following reset is 0 for bits 0, 1, 2, 3
Bit 0 FVMB Feature Vector Memory is Busy
   0=OK to write new value to FV memory (FV memory is empty)
   1=Don't write new value to FV memory (FV memory is busy)
Bit 1 CRM Current Result Memory
   0=Result memory A
   1=Result memory B
   This bit toggles every time the Release Result Memory (RRM) command is issued to the accelerator (register 3). It indicates which memory software should read results from, and which result memory the RRM command should release next time it is issued. Note: Software should also check that results are available in the indicated result memory by checking the value of the MA and MB bits.
Bit 2 MA 1=Results are available is result memory A
   The MA bit is set to 1 when the compute engine completes writing all of the distances for a frame into result memory A. This value is set to zero when the Release Result Memory command is issued and CRM=0.
Bit 3 MB 1=Results are available is result memory B
   The MB bit is set to 1 when the compute engine completes writing all of the distances for a frame into result memory B. This value is set to zero when the Release Result Memory command is issued and CRM=1.
Bit 4 Dfault 1=Accoustic data CRC fault. Indicates that the CRC value at the end of the acoustic data did not match the CRC value computed while the acoustic data was read in.
Bit 5 Future use. Value undefined.
Bit 6 Future use. Value undefined.
Bit 7 Future use. Value undefined.
Register 4 Command
Address=REGBASE+4*4 (and REGBASE+4*4+3 for big endian)
Write-only register.
Software should perform byte writes to this register with a single bit set to 1 and all other bits set to zero to issue a command to the accelerator.
Behaviour is not defined if more than one command is issued within a single write (i.e. if more than 1 bit is a 1).
Value on read is not defined.
Bit 0 LFV Load Feature Vector from the FV memory.
   Tells the accelerator that a new feature vector has been placed into FV memory ready for use by the accelerator. The FV will be loaded into the compute engine when the compute engine completes its current task (or immediately if the compute engine is idle). Computation of distances for this FV will commence when the FV is loaded AND there is a released result memory. (At reset, both result memories are released). The results for the first, third, fifth etc. feature vectors loaded are written to Result Memory A. The results for the second, fourth, sixth etc. feature vectors loaded are written to Result Memory B.
Bit 1 RRM Release Result memory. Indicates that the results in the current result memory can now be overwritten with new results. The current result memory is indicated by the CRM bit in the status register.
Bit 2 CFVI Clear the FV memory empty interrupt
Bit 3 CRI Clear the Results Complete interrupt
Bit 4 Future use—write 0
Bit 5 Future use—write 0
Bit 6 Future use—write 0
Bit 7 Future use—write 0

The present invention may be included in a mobile phone, or in another consumer electronics device, a PC, Laptop or tablet PC, in-car electronics system, or plug-in card for an electronic device.

The methods and apparatus according to the invention are not limited to embedded mobile systems, but may be used with any type of computing device, including PCs, workstations, laptop computers, notebook computers, handheld computing devices, dictation machines, PDAs (personal digital assistants), personal organisers, mobile phones, games consoles, video players, etc. Embedded computers according to the present invention may be embedded in a wide range of apparatus and machinery, such as electronic entertainment products, domestic appliances, factory machinery, vehicles, etc.

Embodiments of the present invention may be implemented as an IP core in a System on Chip (SOC) or a discrete device. Multiple chips or bare die may be connected to provide a larger vocabulary system.

Although the apparatus may include all or some of an input for accepting audio input, a circuit for digitising the audio input, a circuit for dividing the audio input into a plurality of time-frames, and a circuit for analysing the spectral components of each time frame to characterise the audio in that frame, this is not essential. The apparatus may also include a circuit for calculating a score indicating the probability or likelihood that each audio frame corresponds to each of a plurality of different possible states, but again, this is not essential. Instead, the apparatus may include an input for receiving the pre-calculated scores.

In the described embodiments, n-gram language models are used. For example, the Bigram language model is based on outputting the probability that a given second word directly follows a given first word. However, it is possible to use alternative language models instead. It is possible to use a mixture of different models. For example, it is possible to run a word-dependent n-best decode applying a bigram language model, and the resulting word link record or word graph could then be rescored using a trigram language model.

The Viterbi beam search algorithm may be used in embodiments of the invention, to perform the search. A word level search may be performed. Dummy states may be used for the start and end of an utterance The grammar level model may be used to add distance elements into the likelihood calculation. This is not essential, but tends to give much better results.

The HMM models described in the embodiments comprise self connections to each states and single connections to a neighbouring state. However, the present invention is not limited to such HMM models, and for example, HMM models with additional connections between states may also be used. Alternatively, embodiments of the invention may use alternative types of acoustic models, rather than HMM models.

The system may comprise a plurality of language models (e.g. English, French). A model of words may comprise actual words, phrases, silence, lipsmack sounds, and/or other sounds for recognition by the apparatus.

As previously discussed, the phone level has been found to be the best level for lexical tree searching, rather than the state level or the word level. However, this invention is not limited solely to phone level searching.

Pipelining may comprises processing data in different parts of a circuit at the same time, i.e. parallel processing.

In the following claims, the calculation means may comprise the distance calculation engine described above.

Further embodiments of the invention include the methods carried out in the accelerator, and the methods carried out in the speech recognition circuit.

While the invention has been described in terms of what are at present its preferred embodiments, it will be apparent to those skilled in the art that various changes can be made to the preferred embodiments without departing from the scope of the invention, which is defined by the claims.

The invention claimed is:

1. A speech recognition circuit comprising:
 a circuit for providing state identifiers which identify states corresponding to nodes or groups of adjacent nodes in a lexical tree, and for providing scores corresponding to said state identifiers, the lexical tree comprising a model of words;
 a memory structure for receiving and storing state identifiers identified by a node identifier identifying a node or group of adjacent nodes, said memory structure being adapted to allow lookup to identify particular state identifiers, reading of the scores corresponding to the state identifiers, and writing back of the scores to the memory structure after modification of the scores;
 an accumulator for receiving score updates corresponding to particular state identifiers from a score update generating circuit which generates the score updates using audio input, for receiving scores from the memory structure, and for modifying said scores by adding said score updates to said scores; and
 a selector circuit for selecting at least one node or group of adjacent nodes of the lexical tree according to said scores.

2. The speech recognition circuit of claim 1, wherein for at least some of the states, the node identifier comprises a pointer to a node identifier for another state.

3. The speech recognition circuit of claim 1, wherein the lexical tree is arranged with each node corresponding to a phone, and each said state corresponds to a phone or group of adjacent phones in the lexical tree.

4. The speech recognition circuit of claim 3, wherein the memory structure comprises a first part for storing phone instance identifiers uniquely identifying phones or groups of phones and for storing said state identifiers, and the memory structure comprises a second part for storing said phone instance identifiers and node identifiers directly referencing the lexical tree.

5. The speech recognition circuit of claim 2, further comprising a counter for sequentially generating phone instance identifiers as unique identification numbers corresponding to phones or groups of phones in the lexical tree.

6. The speech recognition circuit of claim 1, further comprising a counter for sequentially generating state identifiers, and using said generated state identifiers to sequentially lookup said states in the memory structure.

7. The speech recognition circuit of claim 1, wherein the memory structure is configured to hold a record for each of a plurality of nodes in the lexical tree, the record including said states, a previous node identifier for identifying a previous node in the lexical tree, and information indicating whether said each node is a previous node for another node stored in said memory structure, the speech recognition circuit including a circuit to identify a first node which is not a previous node of another record, and to provide a new data record corresponding to a new node, the new node being the next node after the first node in the lexical tree, using a score associated with the first node.

8. The speech recognition circuit of claim 7, wherein said record comprises a field for storage of a score corresponding to a previous node.

9. The speech recognition circuit of claim 7, further comprising a circuit for overwriting an old record in the memory structure with said new record according to the value of said score for the old record and according to whether said old record is a previous node to said new node or to another node in said memory structure.

10. The speech recognition circuit of claim 1, wherein the memory structure comprises a plurality of memory elements, the memory structure being adapted for independent lookup' of states in each of said memory elements.

11. The speech recognition circuit of claim 10, wherein one of said memory elements is configured to store data relating to a first lexical tree, and a second of said memory elements is configured to store data relating to a second lexical tree, the second lexical tree comprising a different model of words than the first lexical tree.

12. The speech recognition circuit of claim 1, wherein the memory structure comprises at least one content addressable memory and at least one random access memory, the content addressable memory being configured to output addresses of the random access memory.

13. The speech recognition circuit of claim 1, further comprising a delay circuit for storing a state identifier having a plurality of occurrences in the memory structure, and storing the score update for said state identifier, the delay circuit being configured to provide said state identifier and score after a lookup for a second state identifier produces no match in the memory structure.

14. The speech recognition circuit of claim 1, comprising a circuit to set a flag indicating an unfavorable score for all records which are previous records and which have scores outside a predetermined range of values.

15. The speech recognition circuit of claim 1, wherein said memory structure comprises a first memory for receiving and storing said state identifiers, and a second memory for receiving and storing said node identifier, said first memory being configured for lookup to identify particular state identifiers, reading of the scores corresponding to the state identifiers, and writing back of the scores to the memory structure after modification of the scores, and the second memory being adapted to store a record identifier for a record in the first memory and a reference to the node of the lexical tree for the record identifier, said second memory storing a subset of said records which are not previous records.

16. A method of speech recognition, comprising
providing state identifiers which identify states corresponding to nodes or groups of adjacent nodes in a lexical tree, the lexical tree comprising a model of words;
providing scores corresponding to said state identifiers;
receiving and storing state identifiers identified by node identifiers identifying a node or group of adjacent nodes in a memory structure;
looking up said memory structure to identify particular state identifiers;
reading of the scores corresponding to the state identifiers;
receiving score updates corresponding to particular state identifiers from a score update generating circuit which generates the score updates using audio input;
modifying said scores by adding said score updates to said scores;
writing back of the scores to the memory structure after modification of the scores; and
selecting at least one node or group of adjacent nodes of the lexical tree according to said scores.

17. The method of claim 16, wherein for at least some of the states, the node identifier comprises a pointer to a node identifier for another state.

18. The method of claim 16, wherein the lexical tree is arranged with each node corresponding to a phone, and each said state corresponds to a phone or group of adjacent phones in the lexical tree.

19. The method of claim 18, wherein the memory structure comprises a first part for storing phone instance identifiers uniquely identifying phones or groups of phones and for storing said state identifiers, and the memory structure comprises a second part for storing said phone instance identifiers and node identifiers directly referencing the lexical tree.

20. The method of claim 18, further comprising a counter for sequentially generating phone instance identifiers as unique identification numbers corresponding to phones or groups of phones in the lexical tree.

21. The method of claim 16, further comprising a counter for sequentially generating state identifiers, and using said generated state identifiers to sequentially lookup said states in the memory structure.

22. The method of claim 16, wherein the memory structure is configured to hold a record for each of a plurality of nodes in the lexical tree, the record including said states, a previous node identifier for identifying a previous node in the lexical tree, and information indicating whether said each node is a previous node for another node stored in said memory structure, the speech recognition circuit including a circuit to identify a first node which is not a previous node of another record, and to provide a new data record corresponding to a new node, the new node being the next node after the first node in the lexical tree, using a score associated with the first node.

23. The method of claim 22, wherein said record comprises a field for storage of a score corresponding to a previous node.

24. The method of claim 22, further comprising a circuit for overwriting an old record in the memory structure with said new record according to the value of said score for the old record and according to whether said old record is a previous node to said new node or to another node in said memory structure.

25. The method of claim 16, wherein the memory structure comprises a plurality of memory elements, the memory structure being adapted for independent lookup of states in each of said memory elements.

26. The method of claim 25, wherein one of said memory elements is configured to store data relating to a first lexical tree, and a second of said memory elements is configured to store data relating to a second lexical tree, the second lexical tree comprising a different model of words than the first lexical tree.

27. The method of claim 16, wherein the memory structure comprises at least one content addressable memory and at least one random access memory, the content addressable memory being configured to output addresses of the random access memory.

28. The method of claim 16, further comprising a delay circuit for storing a state identifier having a plurality of occurrences in the memory structure, and storing the score update for said state identifier, the delay circuit being configured to provide said state identifier and score after a lookup for a second state identifier produces no match in the memory structure.

29. The method of claim 16, comprising a circuit to set a flag indicating an unfavorable score for all records which are previous records and which have scores outside a predetermined range of values.

30. The method of claim 16, wherein said memory structure comprises a first memory for receiving and storing said state identifiers, and a second memory for receiving and storing said node identifier, said first memory being configured for lookup to identify particular state identifiers, reading of the scores corresponding to the state identifiers, and writing back of the scores to the memory structure after modification of the scores, and the second memory being adapted to store a record identifier for a record in the first memory and a reference to the node of the lexical tree for the record identifier, said second memory storing a subset of said records which are not previous records.

31. A mobile phone including the speech recognition circuit of claim 16.

32. A portable electronic device including the speech recognition circuit of claim 16.

33. A speech recognition circuit comprising:
lexical memory containing lexical data for word recognition, said lexical data comprising a lexical tree data structure comprising a model of words;
means for accessing a state model corresponding to each phone or each group of phones in the lexical tree;
a content addressable memory for storing content addressable data for each phone or group of phones, including states corresponding to said phone or group of phones, and for storing an address value for each said phone or group of phones;

a RAM configured to store accumulated scores for each said phone or group of phones, the accumulated scores being addressable by said address value' for each said phone or group of phones;

means to obtain scores that each of a plurality of frames of an audio signals corresponds to each of a plurality of said states;

a counter to sequentially search for each said state in the content addressable memory, to obtain the corresponding address value if the state is found in the content addressable memory;

means to use said address value to access an accumulated likelihood and an accumulator to add said likelihood to the accumulated likelihood;

means to use the phones or groups of phones with the highest accumulated scores to obtain a plurality of next phones from the lexical tree which correspond to the next phone; and output means for outputting a lexical tree path of highest likelihood.

34. A speech recognition apparatus comprising:

a lexical tree having a corresponding state model;

means for obtaining scores of an audio input corresponding to each of a plurality of states in said state model;

a content addressable memory for storing a marker indicating a part of the lexical tree, and one or more states associated with said part of the lexical tree;

a random access memory addressable by the CAM output, to output accumulated scores for states corresponding to said parts of the lexical tree;

adder means for adding likelihood to said accumulated likelihood, to be stored back in the RAM.

35. A speech recognition apparatus, comprising:

a CAM-RAM arrangement for storing records including pointers to a lexical tree, and accumulative scores for states within the lexical tree;

input means for obtaining scores that an audio frame corresponds to a particular state in the lexical tree;

an accumulator for calculating the updated scores and modifying the records in the CAM-RAM accordingly;

output means for outputting a path of highest likelihood in the lexical tree.

36. A speech recognition method comprising:

storing state identifiers which identify states corresponding to nodes or groups of adjacent nodes in a lexical tree, and scores corresponding to said state identifiers in a memory structure, the lexical tree comprising a model of words and the memory structure being adapted to allow lookup to identify particular state identifiers, reading of the scores corresponding to the state identifiers, and writing back of the scores to the memory structure after modification of the scores;

repeating the following sequence of steps for each of a plurality of incoming frames of an audio signal:

obtaining score updates corresponding to the likelihoods that said frame of the audio signal corresponds to each of a plurality of said states;

accessing said memory structure to obtain scores, updating the scores by adding score updates to the scores, and writing back the updated scores to the memory structure;

determining if scores for states furthest on in the lexical tree correspond to a significant likelihood, and if so, then accessing the lexical tree to determine the next set of possible states; and storing the next set of possible states and said scores of significant likelihood in the memory structure.

37. A speech recognition circuit comprising:

a circuit for providing state identifiers which identify states corresponding to phones or groups of adjacent phones in a lexical tree, and for providing scores corresponding to said state identifiers, the lexical tree comprising a model of words;

a memory structure for receiving and storing state identifiers and phone instance identifiers uniquely identifying instances of phones or groups of phones in the lexical tree;

said memory structure being adapted to allow lookup to identify particular state identifiers, reading of the scores corresponding to the state identifiers, and writing back of the scores to the memory structure after modification of the scores;

an accumulator for receiving score updates corresponding to particular state identifiers from a score update generating circuit which generates the score updates using audio input, for receiving scores from the memory structure, and for modifying said scores by adding said score updates to said scores; and a selector circuit for selecting at least one phone instance identifier according to said scores.

* * * * *